(12) United States Patent  
Elsayad

(10) Patent No.: US 11,777,414 B2  
(45) Date of Patent: Oct. 3, 2023

(54) INTERLEAVED POWER CONVERSION SYSTEMS AND METHODS

(71) Applicant: SCHNEIDER ELECTRIC IT CORPORATION, Foxboro, MA (US)

(72) Inventor: Noureldeen Mohamed Elsayad, Los Angeles, CA (US)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 0 days.

(21) Appl. No.: 17/366,134

(22) Filed: Jul. 2, 2021

(65) Prior Publication Data

US 2023/0006564 A1 Jan. 5, 2023

(51) Int. Cl.
| | |
|---|---|
| *H02M 3/335* | (2006.01) |
| *H02M 7/48* | (2007.01) |
| *H02M 1/00* | (2006.01) |
| *H02M 3/158* | (2006.01) |
| *H02J 9/06* | (2006.01) |
| *H02M 7/219* | (2006.01) |
| *H02M 7/483* | (2007.01) |

(52) U.S. Cl.
CPC ......... *H02M 3/33584* (2013.01); *H02J 9/062* (2013.01); *H02M 1/007* (2021.05); *H02M 3/1586* (2021.05); *H02M 7/219* (2013.01); *H02M 7/483* (2013.01)

(58) Field of Classification Search
CPC .. H02M 3/33584; H02M 1/007; H02M 7/219; H02J 9/062
See application file for complete search history.

(56) References Cited

U.S. PATENT DOCUMENTS

| | | | |
|---|---|---|---|
| 6,330,170 B1 * | 12/2001 | Wang | H02M 7/797 |
| | | | 363/37 |
| 6,400,591 B2 | 6/2002 | Reilly et al. | |
| 7,450,401 B2 * | 11/2008 | Iida | H02M 7/797 |
| | | | 363/16 |
| 8,698,354 B2 | 4/2014 | Ghosh et al. | |
| 9,729,066 B1 * | 8/2017 | Lu | H02M 1/14 |

(Continued)

FOREIGN PATENT DOCUMENTS

| | | |
|---|---|---|
| CN | 104283449 B | 3/2020 |
| WO | 2020035527 A1 | 2/2020 |

OTHER PUBLICATIONS

Extended European Search Report from corresponding European Application No. 22177331.0 dated Oct. 28, 2022.

(Continued)

*Primary Examiner* — Yusef A Ahmed  
(74) *Attorney, Agent, or Firm* — Lando & Anastasi, LLP

(57) ABSTRACT

A bi-directional AC/DC converter is provided including a DC-power connection configured to be coupled to a DC-power source, an AC-power connection configured to be coupled to at least one of an AC-power source or a load, a multiplexer having a plurality of multiplexer switches, at least one interleaved bridge circuit having a plurality of bridge switches coupled to the multiplexer, and a positive DC node and a negative DC node coupled to the plurality of multiplexer switches, wherein the plurality of bridge switches includes at least two bridge switches coupled between the AC-power connection and at least one of the positive DC node or the negative DC node.

20 Claims, 11 Drawing Sheets

(56) References Cited

U.S. PATENT DOCUMENTS

| | | | | |
|---|---|---|---|---|
| 10,277,146 | B2* | 4/2019 | Wang | H02J 3/381 |
| 10,381,921 | B1* | 8/2019 | Haryani | H02M 1/4233 |
| 10,917,006 | B1* | 2/2021 | Oh | H02M 1/4233 |
| 2004/0100149 | A1* | 5/2004 | Lai | H02M 3/1582 |
| | | | | 307/82 |
| 2008/0067872 | A1* | 3/2008 | Moth | H02J 9/062 |
| | | | | 307/64 |
| 2012/0092905 | A1* | 4/2012 | Srighakollapu | H02M 7/4807 |
| | | | | 363/37 |
| 2013/0009700 | A1* | 1/2013 | Deboy | H02M 3/156 |
| | | | | 327/581 |
| 2013/0181529 | A1* | 7/2013 | Tang | H02M 7/53871 |
| | | | | 307/82 |
| 2013/0181530 | A1* | 7/2013 | Deboy | H02J 3/40 |
| | | | | 307/82 |
| 2013/0181531 | A1* | 7/2013 | Deboy | H02J 3/40 |
| | | | | 307/82 |
| 2013/0187473 | A1* | 7/2013 | Deboy | H02M 7/49 |
| | | | | 307/82 |
| 2014/0049998 | A1* | 2/2014 | Casey | H02M 7/48 |
| | | | | 363/97 |
| 2014/0175888 | A1* | 6/2014 | Deboy | H02J 3/381 |
| | | | | 307/82 |
| 2014/0191582 | A1* | 7/2014 | Deboy | H02M 7/4807 |
| | | | | 307/82 |
| 2015/0008748 | A1* | 1/2015 | Deboy | H02M 7/53871 |
| | | | | 307/77 |
| 2015/0015072 | A1* | 1/2015 | Deboy | H02M 7/4807 |
| | | | | 307/52 |
| 2015/0016159 | A1* | 1/2015 | Deboy | H02M 7/4807 |
| | | | | 363/71 |
| 2015/0117073 | A1* | 4/2015 | Flett | H02M 5/4585 |
| | | | | 363/37 |
| 2016/0294290 | A1* | 10/2016 | Tamura | H02M 3/33584 |
| 2017/0229972 | A1* | 8/2017 | Cerqueira Pinto Bezerra Varajão | H02M 7/217 |
| 2017/0244317 | A1* | 8/2017 | Kondo | H02M 7/12 |
| 2017/0294833 | A1* | 10/2017 | Yang | H01F 27/2804 |
| 2018/0076723 | A1* | 3/2018 | Li | H02M 3/3378 |
| 2018/0205306 | A1* | 7/2018 | Huang | H02M 7/797 |
| 2018/0222333 | A1* | 8/2018 | Khaligh | H02M 3/33584 |
| 2019/0146541 | A1* | 5/2019 | Cai | H02M 3/1582 |
| | | | | 327/540 |
| 2020/0014245 | A1* | 1/2020 | Costinett | H02M 7/5387 |
| 2020/0373853 | A1* | 11/2020 | Haryani | H02M 7/53876 |
| 2020/0389099 | A1* | 12/2020 | Sagasta | H02J 9/062 |
| 2021/0006149 | A1* | 1/2021 | Zong | H02M 7/53871 |
| 2021/0296982 | A1* | 9/2021 | Hafezinasab | H02M 3/1582 |
| 2021/0305907 | A1* | 9/2021 | Dong | H02M 1/083 |
| 2021/0359595 | A1* | 11/2021 | Everts | H02M 7/219 |
| 2021/0376754 | A1* | 12/2021 | Jang | H02M 7/2195 |
| 2022/0158559 | A1* | 5/2022 | Lind | H02M 1/4208 |
| 2022/0161673 | A1* | 5/2022 | Jimenez Pino | H02J 7/02 |
| 2022/0190744 | A1* | 6/2022 | Everts | B60L 53/50 |
| 2022/0278607 | A1* | 9/2022 | Everts | H02M 1/4216 |

OTHER PUBLICATIONS

Hong Feng et al: "Interleaved Dual Buck Full-Bridge Three-Level Inverter", IEEE Transactions on Power Electronics,Institute of Electrical and Electronics Engineers,USA, vol. 31, No. 2, Feb. 1, 2016 (Feb. 1, 2016), pp. 964-974, XP011670490,ISSN: 0885-8993, Doi: 10.1109/TPEL.2015.2421295 [retrieved on Sep. 9, 2015].

Renaudineau H et al: "Single-phase dual-mode time-sharing PV string inverter", 2017 IEEE Southern Power Electronics Conference (SPEC), IEEE, Dec. 4, 2017 (Dec. 4, 2017), pp. 1-6, XP033344641, DOI: 10.1109/SPEC.2017.8333613 [retrieved on Apr. 6, 2018].

Sadilek Tomas et al: "A New PFC CCM Boost Rectifier with Extended Gain and Reduced Voltage Switching for 1-ph/3-ph Universal Input On-Board Charger for Electric Vehicles", 2021 IEEE Applied Power Electronics Conference and Exposition (APEC), IEEE, Jun. 14, 2021 (Jun. 14, 2021), pp. 556-563, XP033944981, DOI: 10.1109/APEC42165.2021.9487021 [retrieved on Jul. 14, 2021].

* cited by examiner

INTERLEAVED POWER CONVERSION SYSTEMS AND METHODS

BACKGROUND

1. Field of the Disclosure

At least one example in accordance with the present disclosure relates generally to power conversion.

2. Discussion of Related Art

Power-conversion devices (or "power converters") are configured to convert power. Converting power may include converting power from AC power to DC power or from DC power to AC power. Converting power may also include controlling properties of power. For example, a power-conversion device may convert input DC power of a first voltage level to output DC power of a second voltage level.

SUMMARY

According to at least one aspect of the present disclosure, a bi-directional AC/DC converter is provided comprising a DC-power connection configured to be coupled to a DC-power source, an AC-power connection configured to be coupled to at least one of an AC-power source or a load, a multiplexer having a plurality of multiplexer switches, at least one interleaved bridge circuit having a plurality of bridge switches coupled to the multiplexer, and a positive DC node and a negative DC node coupled to the plurality of multiplexer switches, wherein the plurality of bridge switches includes at least two bridge switches coupled between the AC-power connection and at least one of the positive DC node or the negative DC node.

In some examples, the at least one interleaved bridge circuit includes a first half-bridge circuit and a second half-bridge circuit. In at least one example, the first half-bridge circuit includes a first upper switch and a first lower switch, and the second half-bridge circuit includes a second upper switch and a second lower switch. In various examples, the first upper switch and the second upper switch are coupled between the positive DC node and the AC-power connection, and the first lower switch and the second lower switch are coupled between the negative DC node and the AC-power connection. In some examples, the bi-directional AC/DC converter includes a filter coupled between the AC-power connection and at least one of the first upper switch and the first lower switch, or the second upper switch and the second lower switch.

In at least one example, the filter includes a capacitor configured to be coupled in parallel with the load, and at least one of a first inductor having a first connection coupled between the first upper switch and the first lower switch, and a second connection coupled to the capacitor, or a second inductor having a first connection coupled between the second upper switch and the second lower switch, and a second connection coupled to the capacitor. In various examples, the bi-directional AC/DC converter includes a controller configured to operate the plurality of multiplexer switches to switch at a first frequency, and operate the plurality of bridge switches to switch at a second frequency being different than the first frequency.

In some examples, the second frequency is greater than the first frequency. In at least one example, the first frequency is based on a line frequency of AC power at the AC-power connection. In various examples, the plurality of multiplexer switches includes a first set of multiplexer switches coupled between the positive DC node and the negative DC node, and a second set of multiplexer switches coupled between the DC-power connection and the positive DC node and negative DC node. In some examples, a voltage stress across each multiplexer switch of the plurality of multiplexer switches is no greater than about half of a voltage of the DC-power source.

In at least one example, a voltage stress across each bridge switch of the plurality of bridge switches is no greater than about half of a voltage of the DC-power source. In various examples, the bi-directional AC/DC converter includes a controller configured to operate the plurality of bridge switches in critical-conduction mode. In some examples, operating the plurality of bridge switches in critical-conduction mode provides zero-current switching to the plurality of bridge switches. In at least one example, the controller is configured to operate the plurality of bridge switches via phase-shifted carrier signals.

According to at least one aspect of the disclosure, a non-transitory computer-readable medium storing thereon sequences of computer-executable instructions for controlling a bi-directional AC/DC converter comprising an AC-power connection configured to be coupled to at least one of an AC-power source or a load, a multiplexer having a plurality of multiplexer switches, at least one interleaved bridge circuit having a plurality of bridge switches coupled to the multiplexer, and a positive DC node and a negative DC node coupled to the plurality of multiplexer switches is provided, the sequences of computer-executable instructions including instructions that instruct at least one processor to operate the plurality of multiplexer switches to couple the plurality of bridge switches to at least one of the positive DC node or the negative DC node, operate a first bridge switch of the plurality of bridge switches to couple the AC-power connection to one of the positive DC node or the negative DC node, and operate a second bridge switch of the plurality of bridge switches to couple the AC-power connection to the one of the positive DC node or the negative DC node.

In some examples, the instructions instruct the at least one processor to operate the plurality of multiplexer switches at a first frequency, and to operate the plurality of bridge switches at a second frequency being different than the first frequency. In at least one example, the first frequency is based on a line frequency of AC power at the AC-power connection. In various examples, the second frequency is greater than the first frequency.

According to at least one aspect of the disclosure, a method of assembling a bi-directional AC/DC converter system is provided, the method comprising providing a bi-directional AC/DC converter comprising a DC-power connection configured to be coupled to a DC-power source, an AC-power connection configured to be coupled to at least one of an AC-power source or a load, a multiplexer having a plurality of multiplexer switches, at least one interleaved bridge circuit having a plurality of bridge switches, and a positive DC node and a negative DC node, coupling the plurality of bridge switches to the multiplexer, coupling the positive DC node and the negative DC node to the plurality of multiplexer switches, and coupling at least two bridge switches between the AC-power connection and at least one of the positive DC node or the negative DC node.

According to at least one aspect of the disclosure, a bi-directional AC/DC converter is provided comprising a DC-power connection configured to be coupled to a DC-power source, an AC-power connection configured to be coupled to at least one of an AC-power source or a load, a multiplexer having a plurality of multiplexer switches, at least one interleaved bridge circuit having a plurality of bridge switches, and an unfolder circuit coupled to the AC-power connection and having a plurality of unfolder switches.

In some examples, the bi-directional AC/DC converter includes a controller configured to operate the plurality of unfolder switches at a first frequency, operate the plurality of multiplexer switches at a second frequency, and operate the plurality of bridge switches at a third frequency, wherein the first frequency, the second frequency, and the third frequency are different frequencies. In at least one example, the third frequency is greater than the second frequency, and wherein the second frequency is greater than or equal to the first frequency. In various examples, the first frequency is based on a line frequency of AC power provided at the AC-power connection.

In some examples, the bi-directional AC/DC converter includes a positive DC node and a negative DC node coupled to the plurality of multiplexer switches, wherein the plurality of multiplexer switches includes a first set of multiplexer switches to couple the positive DC node to the plurality of bridge switches, and wherein the plurality of multiplexer switches includes a second set of multiplexer switches to couple the negative DC node to the plurality of bridge switches. In at least one example, the controller is configured to control the first set of multiplexer switches to couple the positive DC node to the plurality of bridge switches responsive to a magnitude of AC voltage provided at the AC-power connection being greater than a threshold value, and control the second set of multiplexer switches to couple the negative DC node to the plurality of bridge switches responsive to a magnitude of AC voltage provided at the AC-power connection being less than the threshold value.

In various examples, the threshold value is one-half of a voltage value of the DC-power source. In some examples, the unfolder circuit is a full-bridge unfolder circuit. In at least one example, the unfolder circuit is a half-bridge unfolder circuit. In various examples, the at least one interleaved bridge circuit includes a first half-bridge circuit and a second half-bridge circuit. In some examples, the first half-bridge circuit includes a first upper switch and a first lower switch, and the second half-bridge circuit includes a second upper switch and a second lower switch. In at least one example, the first upper switch and the second upper switch are coupled between the positive DC node and the AC-power connection, and the first lower switch and the second lower switch are coupled between the negative DC node and the AC-power connection.

In various examples, the bi-directional AC/DC converter includes a controller configured to operate the plurality of bridge switches in critical-conduction mode. In some examples, operating the plurality of bridge switches in critical-conduction mode provides zero-current switching to the plurality of bridge switches. In at least one example, the controller is configured to operate the plurality of bridge switches via phase-shifted carrier signals. In various examples, the plurality of unfolder switches is configured to provide AC power having at least five voltage levels to the AC-power connection. In some examples, the DC-power connection comprises a negative DC-power terminal, and the AC-power connection comprises a negative AC-power terminal coupled to the negative DC-power terminal.

According to at least one aspect of the disclosure, a non-transitory computer-readable medium storing thereon sequences of computer-executable instructions for controlling a bi-directional AC/DC converter comprising an AC-power connection configured to be coupled to at least one of an AC-power source or a load, a multiplexer having a plurality of multiplexer switches, at least one interleaved bridge circuit having a plurality of bridge switches, an unfolder circuit coupled to the AC-power connection and having a plurality of unfolder switches, and a positive DC node and a negative DC node coupled to the plurality of multiplexer switches is provided, the sequences of computer-executable instructions including instructions that instruct at least one processor to operate the plurality of multiplexer switches to couple the plurality of bridge switches to at least one of the positive DC node or the negative DC node, operate the plurality of bridge switches to couple the plurality of unfolder switches to the at least one of the positive DC node or the negative DC node, and operate the plurality of unfolder switches to couple the AC-power connection to the at least one of the positive DC node or the negative DC node.

In some examples, the plurality of bridge switches is operated at a first frequency, the plurality of multiplexer switches is operated at a second frequency being less than the first frequency, and the plurality of unfolder switches is operated at a third frequency being less than the second frequency.

According to at least one aspect of the disclosure, a bi-directional AC/DC converter system is provided comprising a DC-power connection configured to be coupled to a DC-power source, an AC-power connection configured to be coupled to at least one of an AC-power source or a load, a multiplexer having a plurality of multiplexer switches coupled to the DC-power connection, an interleaved bridge circuit having a plurality of bridge switches coupled to the multiplexer, and means for providing AC output power to the AC-power connection received from the plurality of plurality of bridge switches and derived from the DC-power.

According to at least one aspect of the disclosure, a method of assembling a bi-directional AC/DC converter system is provided, the method comprising providing a bi-directional AC/DC converter comprising a DC-power connection configured to be coupled to a DC-power source, an AC-power connection configured to be coupled to at least one of an AC-power source or a load, a multiplexer having a plurality of multiplexer switches, at least one interleaved bridge circuit having a plurality of bridge switches, and an unfolder circuit coupled to the AC-power connection and having a plurality of unfolder switches, coupling the multiplexer to the at least one interleaved bridge circuit, coupling the at least one interleaved bridge circuit to the unfolder circuit, and coupling the unfolder circuit to the AC-power connection.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
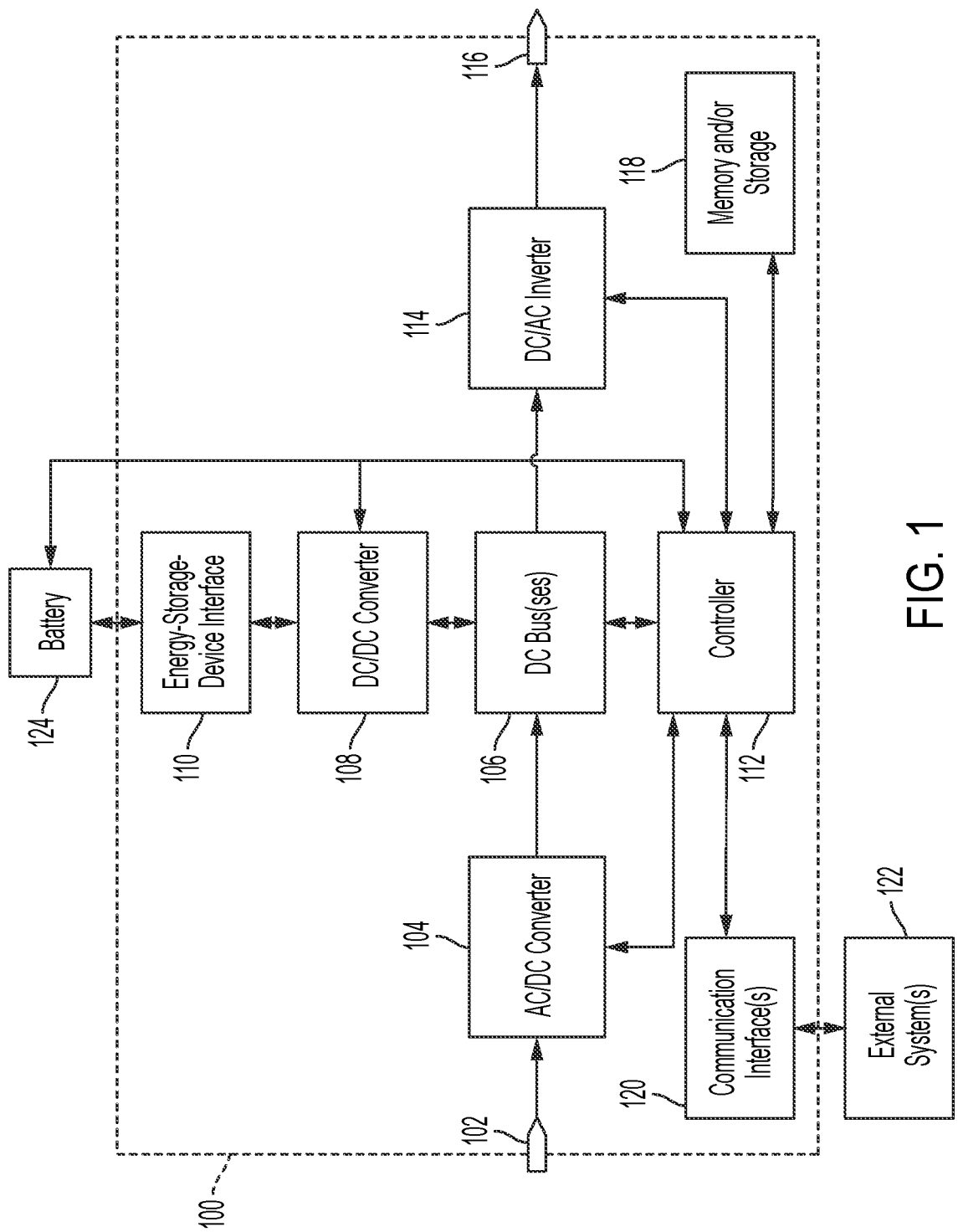
FIG. 1 illustrates a block diagram of an uninterruptible power supply (UPS)

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, power converters may be configured to convert power from one state to another. Power converters may be considered unidirectional or bi-directional. A unidirectional power converter is configured to convert power in one direction only, such as by being configured only to convert DC power to AC power. Such a power converter may be referred to as a unidirectional DC/AC converter (or "inverter"). Similarly, a unidirectional AC/DC converter may be configured to convert AC power to DC power, but not DC power to AC power.

Conversely, a power converter that is "bi-directional" may be configured to convert AC power to DC power, and DC power to AC power. Such a power converter may be variously referred to as a "bi-directional converter," a "bi-directional AC/DC converter," or a "bi-directional DC/AC converter."

Power converters may be implemented in various devices that consume power, including consumer electronics, vehicles, computers, power devices, and so forth. Examples of the disclosure are provided with respect to uninterruptible power supplies (UPSs) for purposes of explanation. However, it is to be appreciated that the principles and example power converters discussed herein are more broadly applicable to devices other than UPSs.

FIG. 1 illustrates a block diagram of one example of a UPS 100. The UPS 100 includes an input 102, an AC/DC converter 104, one or more DC busses 106, a DC/DC converter 108, an energy-storage-device interface 110, a controller 112, a DC/AC inverter 114, an output 116, a memory and/or storage 118, and one or more communication interfaces 120 ("communication interfaces 120"), which may be communicatively coupled to one or more external systems 122 ("external systems 122").

The input 102 is coupled to the AC/DC converter 104 and to an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the energy-storage-device interface 110, and is communicatively coupled to the controller 112. The energy-storage-device interface 110 is coupled to the DC/DC converter 108, and is configured to be coupled to at least one battery 124 and/or another energy-storage device. In some examples, the UPS 100 may include one or more energy-storage devices, such as the battery 124. The DC/AC inverter 114 is coupled to the one or more DC busses 106 and to the output 116, and is communicatively coupled to the controller 112. The output 116 is coupled to the DC/AC inverter 114, and to an external load (not pictured). The controller 112 is communicatively coupled to the AC/DC converter 104, the one or more DC busses 106, the DC/DC converter 108, the energy-storage-device interface 110, the DC/AC inverter 114, the memory and/or storage 118, and the communication interfaces 120.

The input 102 is configured to be coupled to an AC mains power source and to receive input AC power having an input voltage level. The UPS 100 is configured to operate in different modes of operation based on the input voltage of the AC power provided to the input 102. The controller 112 may determine a mode of operation in which to operate the UPS 100 based on whether the input voltage of the AC power is acceptable. The controller 112 may include or be coupled to one or more sensors configured to sense parameters of the input voltage. For example, the controller 112 may include or be coupled to one or more sensors configured to sense a voltage level of the AC power received at the input 102.

When AC power provided to the input 102 is acceptable (for example, by having parameters, such as an input voltage value, that meet specified values, such as by falling within a range of acceptable input voltage values), the controller 112 controls components of the UPS 100 to operate in a normal mode of operation. In the normal mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the energy-storage-device interface 110. The energy-storage-device interface 110 receives the converted DC power, and provides the converted DC power to the battery 124 to charge the battery 124. The DC/AC inverter 114 receives DC power from the one or more DC busses 106, converts the DC power into regulated AC power, and provides the regulated AC power to the output 116 to be delivered to a load.

When AC power provided to the input 102 from the AC mains power source is not acceptable (for example, by having parameters, such as an input voltage value, that do not meet specified values, such as by falling outside of a range of acceptable input voltage values), the controller 112 controls components of the UPS 100 to operate in a backup mode of operation. In the backup mode of operation, DC power is discharged from the battery 124 to the energy-storage-device interface 110, and the energy-storage-device interface 110 provides the discharged DC power to the DC/DC converter 108. The DC/DC converter 108 converts the received DC power and distributes the DC power amongst the one or more DC busses 106. For example, the DC/DC converter 108 may evenly distribute the power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116.

The controller 112 may store information in, and/or retrieve information from, the memory and/or storage 118. For example, the controller 112 may store information indicative of sensed parameters (for example, input-voltage values of the AC power received at the input 102) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the UPS 100, such as a server, database, laptop computer, desktop computer, tablet computer, smartphone, central controller or data-aggregation system, other UPSs, and so forth.

In some examples of the UPS 100, one or more components thereof may be configured to operate unidirectionally. For example, the AC/DC converter 104 may be a unidirectional power converter configured to convert AC power received at the input 102 to DC power provided to the DC busses 106, but not DC power to AC power. Similarly, the DC/AC inverter 114 may be a unidirectional power converter configured to convert DC power received from the DC busses 106 to AC power provided to the DC/AC inverter 114. In various examples, one or more UPSs within the scope of the disclosure may include one or more bidirectional components. For example, an example UPS may include at least one bi-directional AC/DC converter.

Figure 2:
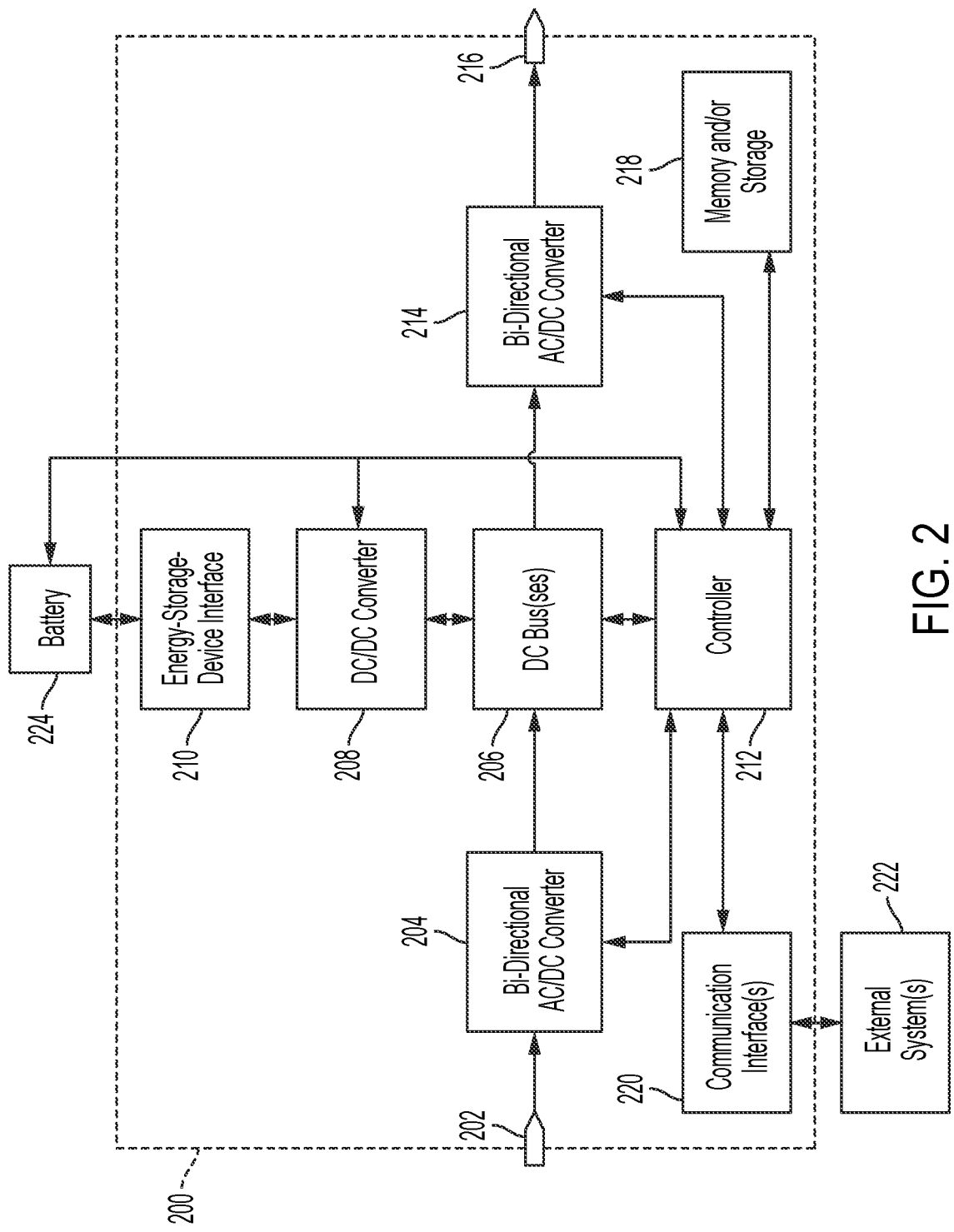
FIG. 2 illustrates a block diagram of a UPS according to another example.

FIG. 2 illustrates a block diagram of a UPS 200 according to an example. The UPS 200 includes an input 202, a first bi-directional AC/DC converter 204, one or more DC busses 206 ("DC busses 206"), an optional DC/DC converter 208, an energy-storage-device interface 210, a controller 212, a second bi-directional AC/DC converter 214, an output 216, memory and/or storage 218, and one or more communication interfaces 220 configured to be coupled to one or more external systems 222. The energy-storage-device interface 210 is configured to be coupled to at least one battery 224. In some examples, the UPS 200 may include the at least one battery 224.

The UPS 200 may be configured to operate substantially similar to the UPS 100. For example, the DC busses 206 may be substantially similar to the DC busses 106, the DC/DC converter 208 may be substantially similar to the DC/DC converter 108, the energy-storage-device interface 210 may be substantially similar to the energy-storage-device interface 110, the controller 212 may be substantially similar to the controller 112, the memory and/or storage 218 may be substantially similar to the memory and/or storage 118, the communication interfaces 220 may be substantially similar to the communication interface 120, the external systems 222 may be substantially similar to the external systems 122, and the battery 224 may be substantially similar to the battery 124.

The UPS 100 also includes the AC/DC converter 104 and the DC/AC inverter 114, each of which may be unidirectional components. Conversely, the UPS 200 includes the first bi-directional AC/DC converter 204 and the second bi-directional AC/DC converter 214. As discussed in greater detail below, the first bi-directional AC/DC converter 204 and the second bi-directional AC/DC converter 214 may be substantially identical in construction to one another, yet are capable of bidirectionally converting AC power to DC power or DC power to AC power.

The first bi-directional AC/DC converter 204 is coupled to the input 202 and the DC busses 206, and in some examples, the DC/DC converter 208. In various examples, the optional DC/DC converter 208 may not be included, and the first bi-directional AC/DC converter 204 may instead be coupled to the energy-storage-device interface 210.

Operation of the UPS 200 may depend at least in part on a quality of AC power received at the input 202. When AC power provided to the input 202 is acceptable (for example, by having parameters, such as an input-voltage value, that meet specified values, such as by falling within a range of acceptable input-voltage values), the controller 212 controls components of the UPS 200 to operate in a normal mode of operation. In the normal mode of operation, AC power received at the input 202 is provided to the first bi-directional AC/DC converter 204. The first bi-directional AC/DC converter 204 converts the received AC power to DC power, and may provide the DC power to the DC busses 206. The DC busses 206 may distribute power to the DC/DC converter 208 and the second bi-directional AC/DC converter 214. The DC/DC converter 208 is configured to convert the DC power and provide the converted power to the energy-storage-device interface 210. If the optional DC/DC converter 208 is not included, the DC busses 206 may provide DC power directly to the energy-storage-device interface 210. The energy-storage-device interface 210 provides power to the battery 224 to charge the battery 224.

In some examples, the second bi-directional AC/DC converter 214 may receive DC power from the DC busses 206, convert the DC power to AC power, and provide at least a portion of the AC power to the output 216. The output 216 may be coupled to a load configured to draw AC power, and the AC power provided to the output 216 may be provided to the load. In some examples, the second bi-directional AC/DC converter 214 may also draw AC power from the output 216 (for example, reactive power provided by the load), convert the AC power to DC power, and provide the DC power to the DC busses 206 to be provided to the battery 224.

When AC power provided to the input 202 is not acceptable (for example, by having parameters, such as an input-voltage value, that do not meet specified values, such as by falling outside of a range of acceptable input-voltage values), the controller 212 controls components of the UPS 200 to operate in a back-up mode of operation (or "battery mode of operation"). In the back-up mode of operation, the UPS 200 draws DC power from the battery 224. DC power received from the battery 224 at the energy-storage-device interface 210 may be provided to the optional DC/DC converter 208, which converts the DC power and provides the converted DC power to the DC busses 206. In examples in which the optional DC/DC converter 208 is not included, the energy-storage-device interface 210 may provide power directly to the DC busses 206.

The DC busses 206 distribute the DC power to the second bi-directional AC/DC converter 214. The second bi-directional AC/DC converter 214 receives the DC power from the DC busses 206, converts the DC power to AC power, and provides the AC power to the output 216. In some examples, the output 216 is coupled to a load, and the power provided to the output 216 is provided to the load. It is to be appreciated that DC power may be drawn from the battery 224 in additional or alternate circumstances than the AC power at the input 202 not being acceptable. For example, DC power may be drawn from the battery 224 in addition to or in lieu of drawing AC power from the input 202 during peak energy-demand time periods in accordance with a peak-shaving operation.

In various examples, the first bi-directional AC/DC converter 204 and the second bi-directional AC/DC converter 214 may be considered "bi-directional" inasmuch as each is configured to convert AC power to DC power and/or DC power to AC power. For example, although in some examples the converters 204, 214 are substantially identical in construction, the first bi-directional AC/DC converter 204 is configured to convert AC power to DC power, and the second bi-directional AC/DC converter 214 is configured to convert DC power to AC power. Accordingly, the converters 204, 214 may differ only in that the first bi-directional AC/DC converter 204 receives AC power as an input, whereas the second bi-directional AC/DC converter 214 receives DC power as an input.

Figure 3:
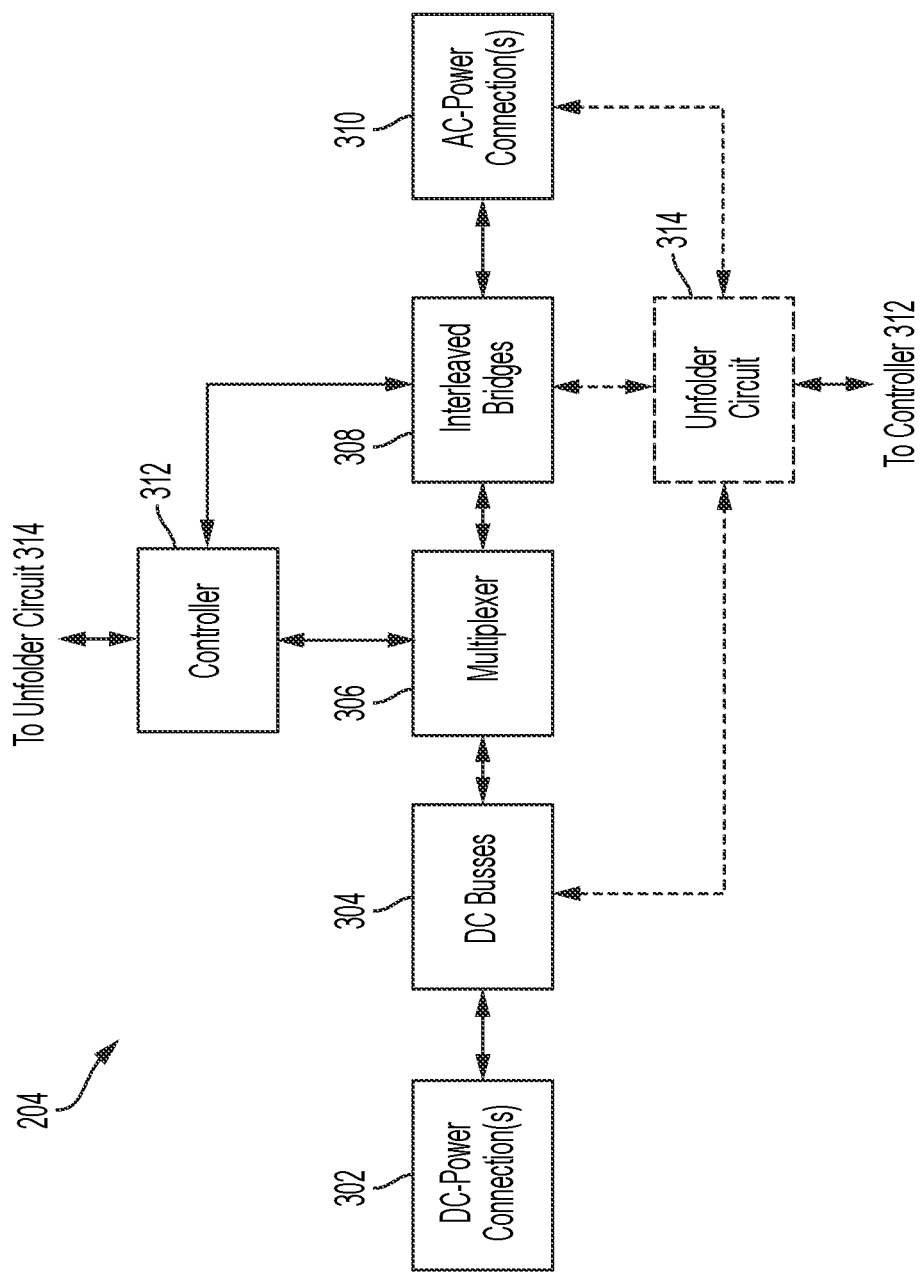
FIG. 3 illustrates a block diagram of a bi-directional AC/DC converter according to an example.

FIG. 3 illustrates a block diagram of a bi-directional AC/DC converter 300 according to an example. The bi-directional AC/DC converter 300 may be an example of the first bi-directional AC/DC converter 204 and/or the second bi-directional AC/DC converter 214 according to an example. The bi-directional AC/DC converter 300 includes one or more DC-power connections 302 ("DC power connection 302"), one or more DC busses 304 ("DC busses 304"), a multiplexer 306, one or more interleaved half-bridges 308 ("interleaved bridges 308"), one or more AC-power connections 310 ("AC-power connection 310"), one or more controllers 312 ("controller 312"), and, optionally, an unfolder circuit 314. In some examples, the controller 212 is or includes the controller 312, which may be external to the bi-directional AC/DC converter 300, and the controller 312 is separately discussed for purposes of explanation only. In another example, the controllers 210, 312 are separate controllers which may be communicatively coupled to one another.

The DC-power connection 302 is coupled to the DC busses 304, and is configured to be coupled to one or more DC-power inputs or one or more DC-power outputs directly or via one or more intermediary components. Whether the DC-power connection 302 draws input power or provides output power may depend on an implementation of the bi-directional AC/DC converter 300. For example, where the first bi-directional AC/DC converter 204 is an example of the bi-directional AC/DC converter 300, the DC-power connection 302 may be configured to be coupled to the DC busses 206. In this example, the bi-directional AC/DC converter 300 may output DC power to the DC-power connection 302 to be provided to the DC busses 206. In another example, where the second bi-directional AC/DC converter 214 is an example of the bi-directional AC/DC converter 300, the DC-power connection 302 may also be configured to be coupled to the DC busses 206. However, in this example, the bi-directional AC/DC converter 300 may draw DC power from the DC-power connection 302.

The DC busses 304 are coupled to the DC-power connection 302 and to the multiplexer 306. The multiplexer 306 is coupled to the DC busses 304 and to the interleaved bridges 308, and is configured to be communicatively coupled to the controller 312. The interleaved bridges 308 are coupled to the multiplexer 306 and the AC-power connection 310, and are configured to be communicatively coupled to the controller 312. In some examples, the interleaved bridges 308 are coupled to the AC-power connection 310 via one or more filters, which are omitted for purposes of clarity. The AC-power connection 310 are coupled to the interleaved bridges 308 and in some examples to the optional unfolder circuit 314.

The AC-power connection 310 may be configured to be coupled to at least one load and/or at least one AC-power source. Whether the AC-power connection 310 draws input power or provides output power may depend on an implementation of the bi-directional AC/DC converter 300. For example, where the first bi-directional AC/DC converter 204 is an example of the bi-directional AC/DC converter 300, the AC-power connection 310 may be configured to be coupled to the input 202. In this example, the bi-directional AC/DC converter 300 may draw AC power from the input 202 at the AC-power connection 310. In another example, where the second bi-directional AC/DC converter 214 is an example of the bi-directional AC/DC converter 300, the AC-power connection 310 may be configured to be coupled to the output 216. In this example, the bi-directional AC/DC converter 300 may output AC power at the output 216 via the AC-power connection 310.

Figure 4:
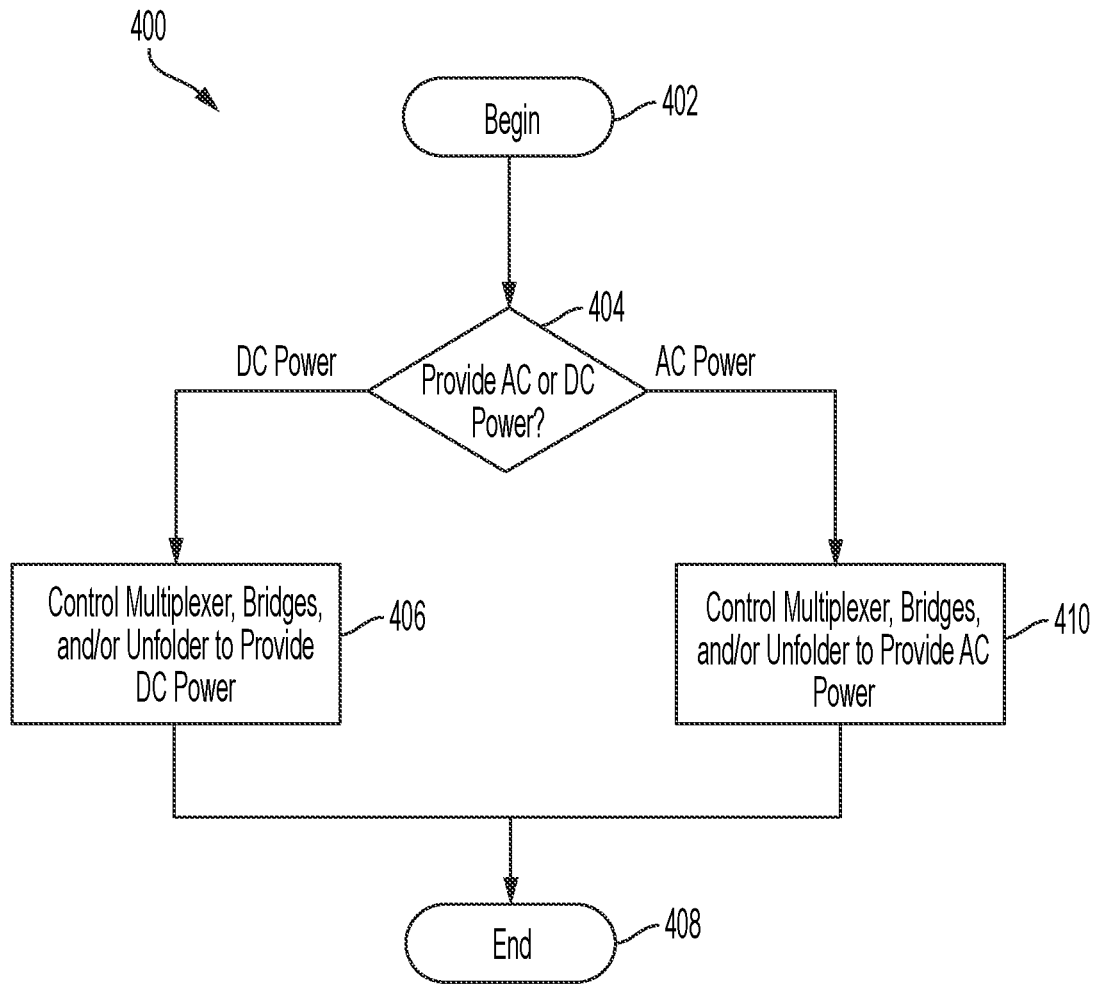
FIG. 4 illustrates a process of operating the bi-directional AC/DC converter of FIG. 3 according to an example.

As discussed above, the bi-directional AC/DC converter 300 may be configured to convert AC power to DC power, DC power to AC power, or a combination of both, depending on an implementation of the bi-directional AC/DC converter 300. FIG. 4 illustrates a process 400 of operating the bi-directional AC/DC converter 300 according to an example. The process 400 may be executed at least in part by the controller 312. As discussed above, the controller 312 may be an example of the controller 212.

At act 402, the process 400 begins.

At act 404, the controller 312 determines whether to provide AC power or DC power. Determining whether to provide AC power or DC power may depend on which of the DC-power connection 302 and the AC-power connection 310 is coupled to a power source. For example, if AC power is available from an AC-power source coupled to the AC-power connection 310, the controller 312 may determine that the bi-directional AC/DC converter 300 will draw AC power from the AC-power connection 310 and provide DC power at the DC-power connection 302 (404 DC Power). Where the first bi-directional AC/DC converter 204 is an example of the bi-directional AC/DC converter 300, the controller 312 may determine that AC power is available (for example, via the input 202) and that the controller 312 should provide DC power (for example, to the DC busses 206) (404 DC Power). The process 400 then continues to act 406.

At act 406, the controller 312 controls the multiplexer 306, the interleaved bridges 308, and/or the unfolder circuit 314 to provide DC power to the DC-power connection 302. In one example, the first bi-directional AC/DC converter 204 is configured to receive AC power at the AC-power connection 310. For example, as discussed above, the AC-power connection 310 may be configured to be coupled to at least one AC-power source (for example, via the input 202) that provides AC power to the first bi-directional AC/DC converter 204. The AC power may be provided to the interleaved bridges 308, which may act as a power-factor-correction (PFC) circuit and rectify the AC power to DC power. The interleaved bridges 308 provide the DC power to the multiplexer 306, which provides the DC power to the DC busses 304. The DC busses 304 provide the DC power to the DC-power connection 302, such that DC power is provided to, for example, the DC busses 206.

The process 400 then ends at act 408. However, in some examples, the process 400 is continuously or repeatedly executed (or re-executed) such that the process 400 returns to act 404.

Returning to act 404, if the controller provides AC power (404 AC Power), then the process 400 continues to act 410. For example, if DC power is available from a DC-power source coupled to the DC-power connection 302, the controller 312 may determine that the bi-directional AC/DC converter 300 will draw DC power from the DC-power connection 302 and provide AC power at the AC-power connection 310 (404 AC Power). Where the second bi-directional AC/DC converter 214 is an example of the bi-directional AC/DC converter 300, the controller 312 may determine that DC power is available (for example, via the DC busses 206) and that the controller 312 should provide AC power (for example, to the output 216) (404 AC Power). The process 400 then continues to act 410.

At act 410, the controller 312 controls the multiplexer 306, interleaved bridges 308, and/or the unfolder circuit 314 to provide AC power to the AC-power connection 310. In one example, the second bi-directional AC/DC converter 214 is configured to receive DC power at the DC-power connection 302. For example, as discussed above, the DC-power connection 302 may be configured to be coupled to the DC busses 206 to draw DC power. The DC power may be provided to the DC busses 304. The DC busses 304 provide DC power to the multiplexer 306. The multiplexer 306 provides DC power to the interleaved bridges 308. For example, the multiplexer 306 may provide a positive DC voltage to the interleaved bridges 308 during a positive half-cycle of AC power provided at the AC-power connection 310, and may provide a negative DC voltage to the interleaved bridges 308 during a negative half-cycle of AC power provided at the AC-power connection 310.

The interleaved bridges 308 convert the DC power to AC power, and provide the AC power to the AC-power connection 310. For example, the interleaved bridges 308 may include one or more half-bridge circuits configured to operate as an inverter at act 410. In examples in which the optional unfolder circuit 314 is included, the interleaved bridges 308 may also provide AC power to the unfolder circuit 314. The unfolder circuit 314 may include a half-bridge or full-bridge circuit configured to provide the AC power to the AC-power connection 310. In various examples, the unfolder circuit 314 may increase a number of voltage levels of the AC power (thereby reducing a total harmonic distortion), increase a voltage rating of the output AC power, reduce a voltage stress on one or more switches of the bi-directional AC/DC converter 300, and/or increase an efficiency of the bi-directional AC/DC converter 300. The AC-power connection 310 receive the AC power from the interleaved bridges 308 and/or the unfolder circuit 314, and provide the AC power to one or more loads coupled to the AC-power connection 310 (for example, via the output 216).

The process 400 then ends at act 408. As discussed above, however, the process 400 may be repeatedly or continuously executed.

Accordingly, the first bi-directional AC/DC converter 204 may be configured to convert DC power received at the DC-power connection 302 to AC power to be output to one or more loads at the AC-power connection 310, and may be configured to convert AC power received at the AC-power connection 310 to DC power to be output to one or more energy-storage devices at the DC-power connection 302. Examples of bi-directional AC/DC converters are described below with respect to FIGS. 5-11.

Figure 5:
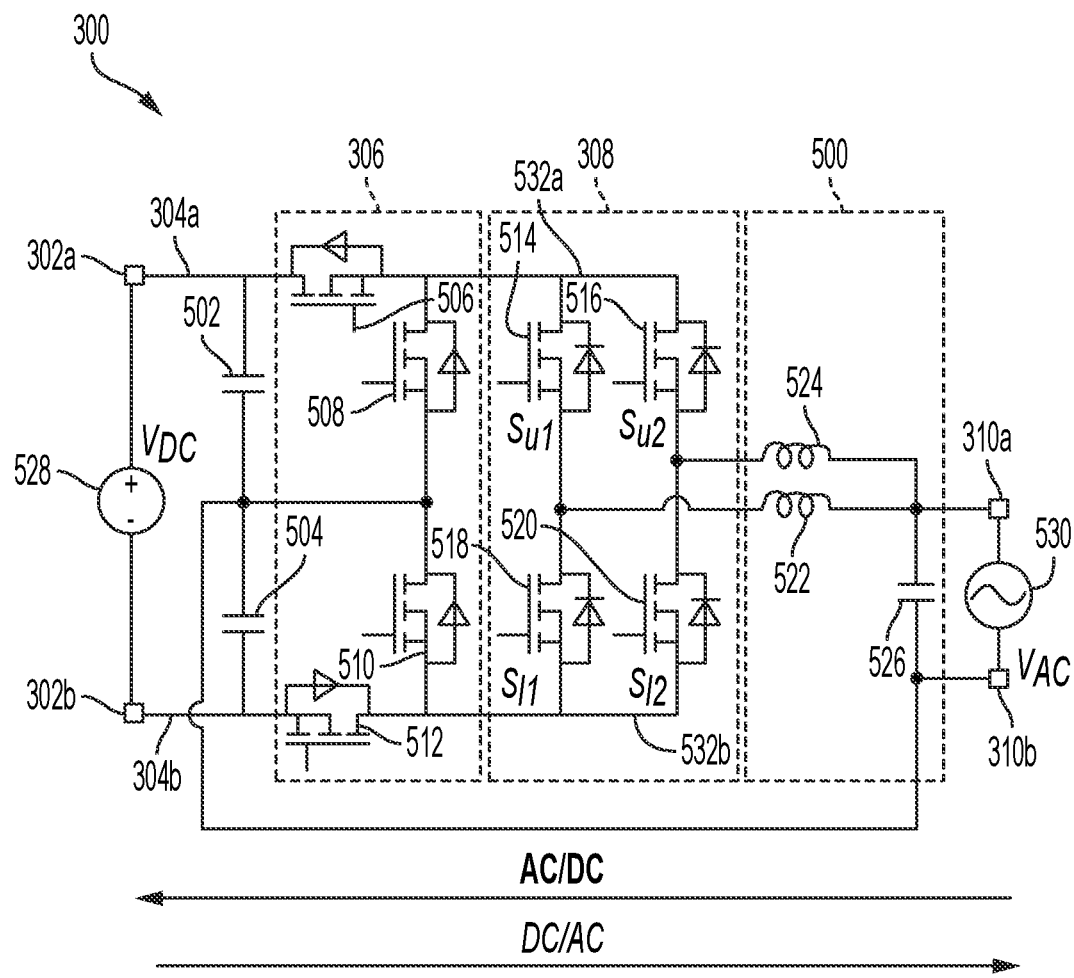
FIG. 5 illustrates a schematic diagram of the bi-directional AC/DC converter of FIG. 3 according to an example.

FIG. 5 illustrates a schematic diagram of the bi-directional AC/DC converter 300 according to an example. As discussed above, the bi-directional AC/DC converter 300 may be implemented as, for example, either or both of the converters 204, 214. The bi-directional AC/DC converter 300 includes a first DC-power connection 302a and a second DC-power connection 302b (collectively, the DC-power connection 302), a first DC bus 304a and a second DC bus 304b (collectively, the DC busses 304), the multiplexer 306, the interleaved bridges 308, a first AC-power connection 310a and a second AC-power connection 310b (collectively, the AC-power connection 310), a filter 500, a first capacitor 502, and a second capacitor 504. The multiplexer 306 includes a first multiplexer switch 506, a second multiplexer switch 508, a third multiplexer switch 510, and a fourth multiplexer switch 512. The interleaved bridges 308 include a first upper switch 514, a second upper switch 516, a first lower switch 518, and a second lower switch 520. The filter 500 includes a first inductor 522, a second inductor 524, and a third capacitor 526.

The DC-power connection 302 is configured to be coupled to at least one of a DC-power source or a DC-power sink. For purposes of explanation, an example is provided in which the DC-power connection 302 is coupled to a DC-power source 528. For example, the DC-power source 528 may be indicative of the DC busses 206, from which DC power may be drawn. Similarly, the AC-power connection 310 is configured to be coupled to at least one of an AC-power source or an AC-power sink. For purposes of explanation, an example is provided in which the AC-power connection 310 is coupled to an AC-power load 530. For example, the AC-power load 530 may be indicative of the output 216, or of a load coupled to the output 216. Accordingly, in one example for purposes of explanation, the bi-directional AC/DC converter 300 of FIG. 5 may represent an example of the second bi-directional AC/DC converter 214.

The first DC-power connection 302a is coupled to the first multiplexer switch 506 and the first capacitor 502 via the first DC bus 304a, and is configured to be coupled to the DC-power source 528. The second DC-power connection 302b is coupled to the fourth multiplexer switch 512 and the second capacitor 504 via the second DC bus 304b, and is configured to be coupled to the DC-power source 528. The first DC bus 304a is coupled to the first DC-power connection 302a, the first capacitor 502, and the first multiplexer switch 506. The second DC bus 304b is coupled to the second DC-power connection 302b, the second capacitor 504, and the fourth multiplexer switch 512.

The first AC-power connection 310a is coupled to the first inductor 522, the second inductor 524, and the third capacitor 526, and is configured to be coupled to at least one of the load 530 or the AC-power source. The second AC-power connection 310b is coupled to the first capacitor 502, the second capacitor 504, the third capacitor 526, the second multiplexer switch 508, and the third multiplexer switch 510.

The first capacitor 502 is coupled to the first DC-power connection 302a and the first multiplexer switch 506 via the first DC bus 304a at a first connection, and is coupled to the second multiplexer switch 508, the third multiplexer switch 510, the second capacitor 504, the third capacitor 526, and the second AC-power connection 310b at a second connection. The second capacitor 504 is coupled to the second multiplexer switch 508, the third multiplexer switch 510, the first capacitor 502, the third capacitor 526, and the second AC-power connection 310b at a first connection, and is coupled to the second DC-power connection 302b and the fourth multiplexer switch 512 via the second DC bus 304b at a second connection.

The first multiplexer switch 506 is coupled to the first DC-power connection 302a and the first capacitor 502 via the first DC bus 304a at a first connection, is coupled to the second multiplexer switch 508, the first upper switch 514, and the second upper switch 516 at a second connection, and is communicatively coupled to the controller 312 at a control connection. The second multiplexer switch 508 is coupled to the first multiplexer switch 506, the first upper switch 514, and the second upper switch 516 at a first connection, is coupled to the first capacitor 502, the second capacitor 504, the third capacitor 526, the third multiplexer switch 510, and the second AC-power connection 310b at a second connection, and is communicatively coupled to the controller 312 at a control connection.

The third multiplexer switch 510 is coupled to the first capacitor 502, the second capacitor 504, the third capacitor 526, the second multiplexer switch 508, and the second AC-power connection 310b at a first connection, is coupled to the fourth multiplexer switch 512, the first lower switch 518, and the second lower switch 520 at a second connection, and is communicatively coupled to the controller 312 at a control connection. The fourth multiplexer switch 512 is coupled to the second capacitor 504 and the second DC-power connection 302b via the second DC bus 304b at a first connection, is coupled to the third multiplexer switch 510, the first lower switch 518, and the second lower switch 520 at a second connection, and is communicatively coupled to the controller 312 at a control connection.

The first upper switch 514 is coupled to the first multiplexer switch 506, the second multiplexer switch 508, and the second upper switch 516 at a first connection, is coupled to the first lower switch 518 and the first inductor 522 at a second connection, and is communicatively coupled to the controller 312 at a control connection. The second upper switch 516 is coupled to the first multiplexer switch 506, the second multiplexer switch 508, and the first upper switch 514 at a first connection, is coupled to the second lower switch 520 and the second inductor 524 at a second connection, and is communicatively coupled to the controller 312 at a control connection.

The first lower switch 518 is coupled to the first upper switch 514 and the first inductor 522 at a first connection, is coupled to the third multiplexer switch 510, the fourth multiplexer switch 512, and the second lower switch 520 at a second connection, and is communicatively coupled to the controller 312 at a control connection. The second lower switch 520 is coupled to the second upper switch 516 and the second inductor 524 at a first connection, is coupled to the third multiplexer switch 510, the fourth multiplexer switch 512, and the first lower switch 518 at a second connection, and is communicatively coupled to the controller 312 at a control connection.

The first inductor 522 is coupled to the first upper switch 514 and the first lower switch 518 at a first connection, and is coupled to the third capacitor 526, the first AC-power connection 310a, and the second inductor 524 at a second connection. The second inductor 524 is coupled to the second upper switch 516 and the second lower switch 520 at a first connection, and is coupled to the third capacitor 526, the first AC-power connection 310a, and the first inductor 522 at a second connection. The third capacitor 526 is coupled to the first inductor 522, the second inductor 524, and the first AC-power connection 310a at a first connection, and is coupled to the second AC-power connection 310b, the second multiplexer switch 508, the third multiplexer switch 510, the first capacitor 502, and the second capacitor 504 at a second connection.

The multiplexer 306 is coupled to the interleaved bridges 308 via a positive DC node 532a and a negative DC node 532b (collectively, "DC nodes 532"). The DC nodes 532 are configured to conduct power between the multiplexer switches 506, 508, 510, and 512 (collectively, "multiplexer switches 506-512") and the switches 514, 516, 518, and 520 (collectively, "interleaved half-bridge switches 514-520" or simply "bridge switches 514-520"). The positive DC node 532a is coupled to the first multiplexer switch 506, the second multiplexer switch 508, the first upper switch 514, and the second upper switch 516. The negative DC node 532b is coupled to the third multiplexer switch 510, the fourth multiplexer switch 512, the first lower switch 518, and the second lower switch 520.

Where the bi-directional AC/DC converter 300 is configured to convert DC power to AC power (for example, where the AC/DC converter 300 is an example of the second bi-directional AC/DC converter 214), the controller 312 may control components of the bi-directional AC/DC converter 300, including the switches 506-520, to convert DC power received at the DC-power connection 302 to AC power provided to the AC-power connection 310.

Where the bi-directional AC/DC converter 300 is configured to convert AC power to DC power (for example, where the AC/DC converter 300 is an example of the first bi-directional AC/DC converter 204), the controller 312 may control components of the first bi-directional AC/DC converter 204 to convert AC power received at the AC-power connection 310 to DC power provided to the DC-power connection 302. For example, the controller 312 may control the switches 506-520 via one or more pulse-width-modulation (PWM) signals.

However, it is to be appreciated that the bi-directional AC/DC converter 300 may convert AC power to DC power at a first point in time, and may convert DC power to AC power at another point in time. For example, where the bi-directional AC/DC converter 300 is an example of the second bi-directional AC/DC converter 214, the bi-directional AC/DC converter 300 may convert DC power (for example, drawn from the DC busses 206) to AC power at a first point in time, and may convert AC power (for example, reactive power drawn from a load connected to the output 216) to DC power at a second point in time.

For purposes of explanation, however, an implementation of controlling the bi-directional AC/DC converter 300 to convert DC power received at the DC-power connection 302 to AC power provided at the AC-power connection 310 is provided.

In one example, the multiplexer 306 operates as a low-frequency multiplexer while converting DC power to AC power. The first multiplexer switch 506 and the third multiplexer switch 510 may conduct alternately with the second multiplexer switch 508 and the fourth multiplexer switch 512, such that the interleaved bridges 308 are alternately coupled in parallel with the first capacitor 502 and the second capacitor 504. In one example, the first capacitor 502 may be considered a positive capacitor (or "positive-bus capacitor"), and the second capacitor 504 may be considered a negative capacitor (or "negative-bus capacitor").

As discussed in greater detail below, the multiplexer switches 506-512 may be switched at a frequency approximately equal to a frequency of AC power provided at the AC-power connection 310, also referred to as a "line frequency," or at a multiple thereof (for example, one half of the line frequency, two times the line frequency, four times the line frequency, and so forth). For example, the multiplexer switches 506-512 may couple the first capacitor 502, which may be a positive capacitor, to the interleaved bridges 308 during a positive half-cycle of AC output power, and may couple the second capacitor 504, which may be a negative capacitor, to the interleaved bridges 308 during a negative half-cycle of the AC output power. Accordingly, the multiplexer switches 506-512 may couple the interleaved bridges 308 to a desired one of the capacitors 502, 504 while converting DC power to AC power.

Furthermore, the implementation of the multiplexer switches 506-512 may provide for a voltage stress on any of the switches 506-520 being, at most, about half of a DC-voltage value of the DC-power source 528 at any one time. The multiplexer switches 506-512 may therefore reduce a voltage stress on the bridge switches 514-520 as compared to, for example, replacing the first multiplexer switch 506 and fourth multiplexer switch 512 with short circuits, and the second multiplexer switch 508 and third multiplexer switch 510 with open circuits.

In one example, the interleaved bridges 308 operate as an inverter circuit while converting DC power to AC power. The interleaved bridges 308 may include a first half-bridge, including the first upper switch 514 and first lower switch 518, and a second half-bridge, including the second upper switch 516 and second lower switch 520. In this example, the first half-bridge is coupled to the first inductor 522, and the second half-bridge is coupled to the second inductor 524.

In at least one example, the controller 312 operates the bridge switches 514-520 in critical-conduction mode (CrCM) whereby the first upper switch 514 and the first lower switch 518 of the first half-bridge are switched based at least in part on a current through the first inductor 522, and the second upper switch 516 and the second lower switch 520 of the second half-bridge are switched based at least in part on a current through the second inductor 524.

Operating the bridge switches 514-520 in CrCM may provide for zero-current switching (ZCM) of the bridge switches 514-520, thereby enabling a reduction in switching losses in the bridge switches 514-520 and a reduction in cooling requirements as a result of reduced switching losses. Furthermore, a size of the inductors 522, 524 may be reduced at least in part by the interleaved configuration of the bridge switches 514-520. In some examples, the controller 312 controls the first half-bridge switches 514, 518 and the second half-bridge switches 516, 520 via phase-shifted carrier signals that are 180° out of phase with one another, such that a ripple current through the third capacitor 526 via the first inductor 522 substantially cancels a ripple current through the third capacitor 526 via the second inductor 524. Accordingly, at least because a total ripple current may be reduced, a size of the first inductor 522, second inductor 524, and third capacitor 526 may be reduced as compared to, for example, a circuit having only one half-bridge circuit.

Figure 6:
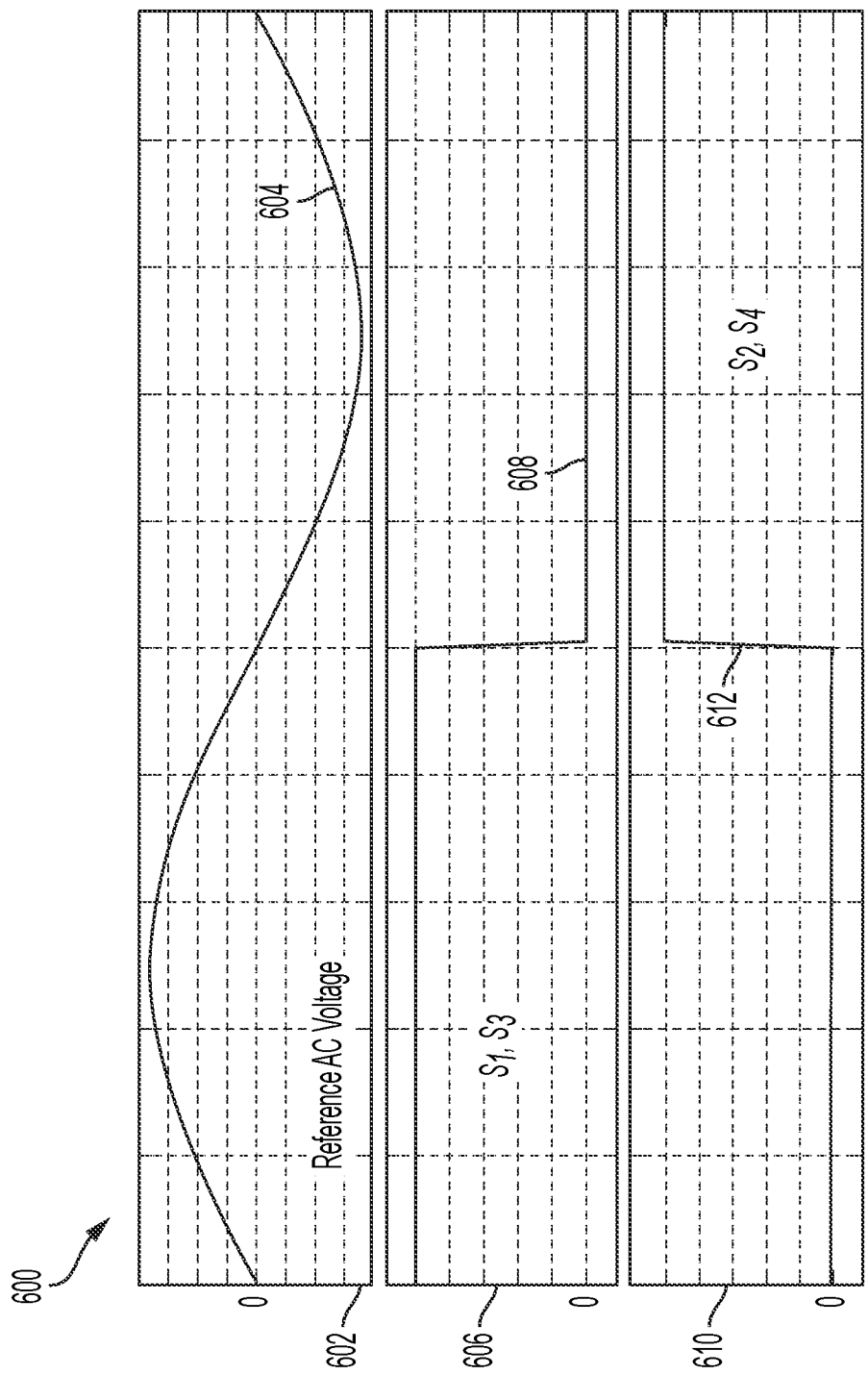
FIG. 6 illustrates a graphic diagram of a control scheme for operating the bi-directional AC/DC converter of FIG. 5 according to an example.

FIG. 6 illustrates a graphic diagram 600 of a control scheme for operating the bi-directional AC/DC converter 300 according to an example. For example, the graphic diagram 600 may illustrate a control scheme executed by the controller 312 to control the switches 506-512. A first graph 602 includes a reference-AC-waveform trace 604. A second graph 606 includes a first control-signal trace 608. A third graph 610 includes a second control-signal trace 612.

The reference-AC-waveform trace 604 illustrates a reference sinusoidal wave, which may be representative of a desired waveform of AC power provided at the AC-power connection 310. The first control-signal trace 608 illustrates one or more PWM signals provided to the first multiplexer switch 506 and the third multiplexer switch 510. The second control-signal trace 612 illustrates one or more PWM signals provided to the second multiplexer switch 508 and the fourth multiplexer switch 512.

As discussed above, and as illustrated by the second graph 604, the first multiplexer switch 506 and the third multiplexer switch 510 may be operated to be closed and conducting to couple the interleaved bridges 308 in parallel with the first capacitor 502 during a positive half-cycle of AC power provided at the AC-power connection 310, as illustrated by the reference-AC-waveform trace 604. Similarly, and as illustrated by the third graph 610, the second multiplexer switch 508 and the fourth multiplexer switch 512 may be operated to be closed and conducting to couple the interleaved bridges 308 in parallel with the second capacitor 504 during a negative half-cycle of AC power provided at the AC-power connection 310, as illustrated by the reference-AC-waveform trace 604.

Figure 7:
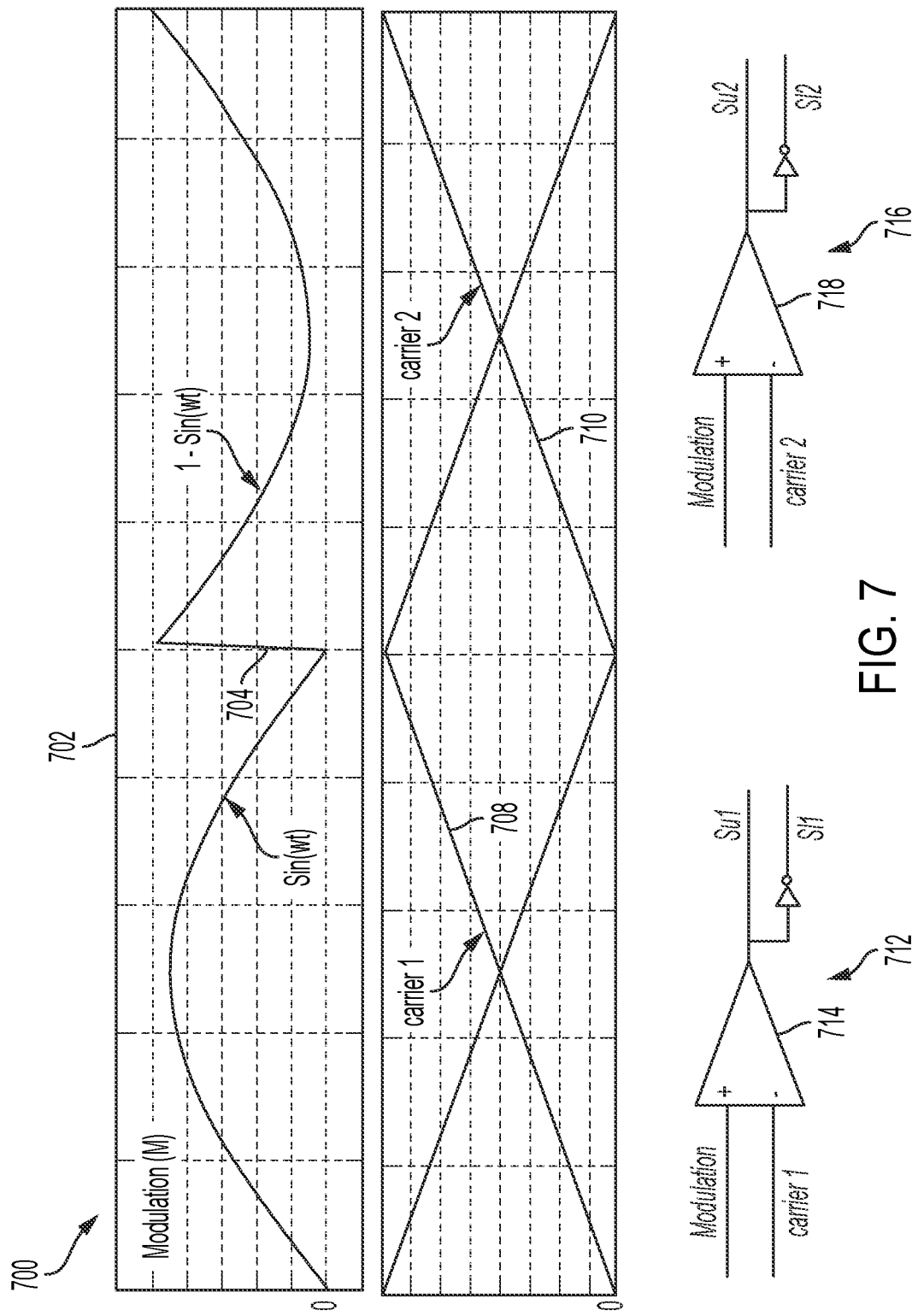
FIG. 7 illustrates a graphic diagram of a control scheme for operating the bi-directional AC/DC converter of FIG. 5 according to an example.

FIG. 7 illustrates a graphic diagram 700 of a control scheme for operating the bi-directional AC/DC converter 300 according to an example. For example, the graphic diagram 700 may illustrate a control scheme executed by the controller 312 to control the bridge switches 514-520. A first graph 702 includes a modulation-waveform trace 704. A second graph 706 includes a first carrier-signal trace 708 and a second carrier-signal trace 710. A first logic topology 712 includes a first comparator 714. The second logic topology 716 includes a second comparator 718.

As illustrated by the modulation-waveform trace 704, a modulation waveform is represented by the function $\sin(\omega t)$ for a first half-period, and by the function $(1-\sin(\omega t))$ for a second half-period. A first carrier signal illustrated by the first carrier-signal trace 708 is a triangle wave, and a second carrier signal illustrated by the second carrier-signal trace 710 is a triangle wave that is 180° out of phase with the first carrier signal.

The first comparator 714 receives the modulation waveform indicated by the modulation-waveform trace 704 at a noninverting input, and receives the first carrier signal indicated by the first carrier-signal trace 708 at an inverting input. An output of the first comparator 714 is provided as a first PWM signal to the first upper switch 514, and an inverted output of the first comparator 714 is provided as a second PWM signal provided to the first lower switch 518.

Similarly, the second comparator 718 receives the modulation waveform indicated by the modulation-waveform trace 704 at a noninverting input, and receives the second carrier signal indicated by the second carrier-signal trace 710 at an inverting input. An output of the second comparator 718 is provided as a third PWM signal to the second upper switch 516, and an inverted output of the second comparator 718 is provided as a fourth PWM signal to the second lower switch 520. Accordingly, at least in part due to the first carrier signal being 180° out of phase with the second carrier signal, PWM signals provided to the first upper switch 514 and the first lower switch 518 are 180° out of phase with PWM signals provided to the second upper switch 516 and the second lower switch 520.

Accordingly, examples have been provided in which the bi-directional AC/DC converter 300 is configured to convert DC power received via the DC-power connection 302 into AC power to be output at the AC-power connection 310. As discussed above, the bi-directional AC/DC converter 300 may also be configured to convert AC power received via the AC-power connection 310 into DC power to be output at the DC-power connection 302. For example, where the bi-directional AC/DC converter 300 is implemented as the second bi-directional AC/DC converter 214, the AC-power connection 310 may be coupled to a load that discharges reactive power back to the bi-directional AC/DC converter 300 via the output 216, which the bi-directional AC/DC converter 300 can advantageously absorb as a low-frequency ripple on the DC busses 304. In another example, where the bi-directional AC/DC converter 300 is implemented as the first bi-directional AC/DC converter 204, the AC-power connection 310 may be coupled to the input 202, which provides AC power to the bi-directional AC/DC converter 300 such that the bi-directional AC/DC converter 300 converts the AC power to DC power to be output at the DC-power connection 302.

In one example of the bi-directional AC/DC converter 300 converting AC power to DC power, the bridge switches 514-520, in combination at least with the inductors 522, 524, may be operated as a boost PFC circuit. The multiplexer switches 506-512 may be operated to direct DC power from the interleaved bridges 308 to the DC busses 304, which direct DC power to the DC-power connection 302.

As discussed above, the bi-directional AC/DC converter 300 may include additional, optional components such as the unfolder circuit 314. The unfolder circuit 314 may advantageously increase a number of voltage levels of the bi-directional AC/DC converter 300. For example, whereas the bi-directional AC/DC converter 300 may be configured to support three voltage levels, the unfolder circuit 314 may enable the bi-directional AC/DC converter 300 to support five voltage levels, decreasing a total harmonic distortion (THD) of the bi-directional AC/DC converter 300. Consequently, a minimum voltage value available at the DC-power connection 302 required to achieve a particular voltage at the AC-power connection 310 may be reduced, thereby reducing a voltage stress on components of the bi-directional AC/DC converter 300 and increasing an efficiency of the bi-directional AC/DC converter 300.

Figure 8:
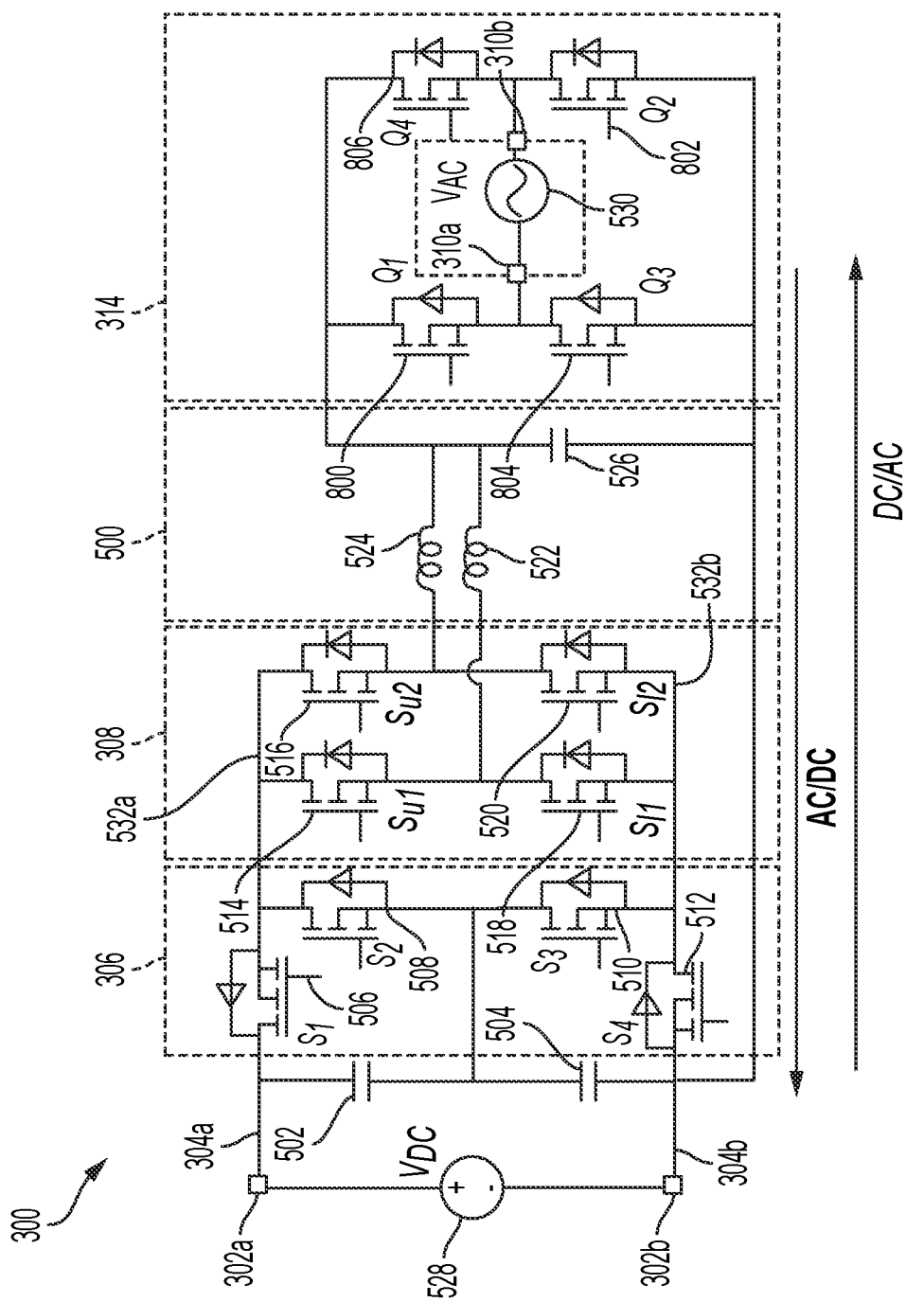
FIG. 8 illustrates a schematic diagram of the bi-directional AC/DC converter of FIG. 3 according to another example.

FIG. 8 illustrates a schematic diagram of the bi-directional AC/DC converter 300 according to another example. The example of FIG. 8 is similar to the example of FIG. 5, and like components are labeled accordingly. The bi-directional AC/DC converter 300 of FIG. 8 further includes an example of the unfolder circuit 314. The unfolder circuit 314 includes a first unfolder switch 800, a second unfolder switch 802, a third unfolder switch 804, and a fourth unfolder switch 806.

The first unfolder switch 800 is coupled to the first inductor 522, the second inductor 524, the third capacitor 526, and the fourth unfolder switch 806 at a first connection, is coupled to the third unfolder switch 804 and the first AC-power connection 310a at a second connection, and is communicatively coupled to the controller 312 at a control connection. The second unfolder switch 802 is coupled to the fourth unfolder switch 806 and the second AC-power connection 310b at a first connection, is coupled to the second DC-power connection 302b, the second capacitor 504, the fourth multiplexer switch 514, the third capacitor 526, and the third unfolder switch 804 via the second DC bus 304b at a second connection, and is communicatively coupled to the controller 312 at a control connection.

The third unfolder switch 804 is coupled to the first unfolder switch 800 and the first AC-power connection 310a at a first connection, is coupled to the second DC-power connection 302b, the second capacitor 504, the fourth multiplexer switch 514, the third capacitor 526, and the second unfolder switch 802 via the second DC bus 304b at a second connection, and is communicatively coupled to the controller 312 at a control connection. The fourth unfolder switch 806 is coupled to the first inductor 522, the second inductor 524, the third capacitor 526, and the first unfolder switch 800 at a first connection, is coupled to the second unfolder switch 802 and the second AC-power connection 310b at a second connection, and is communicatively coupled to the controller 312 at a control connection.

In various examples, the unfolder switches 800-806 may be considered to be in a full-bridge, or "H-bridge," configuration to provide power of alternating polarity to the AC-power connection 310. For example, the first unfolder switch 800 and second unfolder switch 802 may be simultaneously closed to provide positive-polarity power to the AC-power connection 310, and the third unfolder switch 804 and fourth unfolder switch 806 may be simultaneously closed to provide negative-polarity power to the AC-power connection 310.

Figure 9:
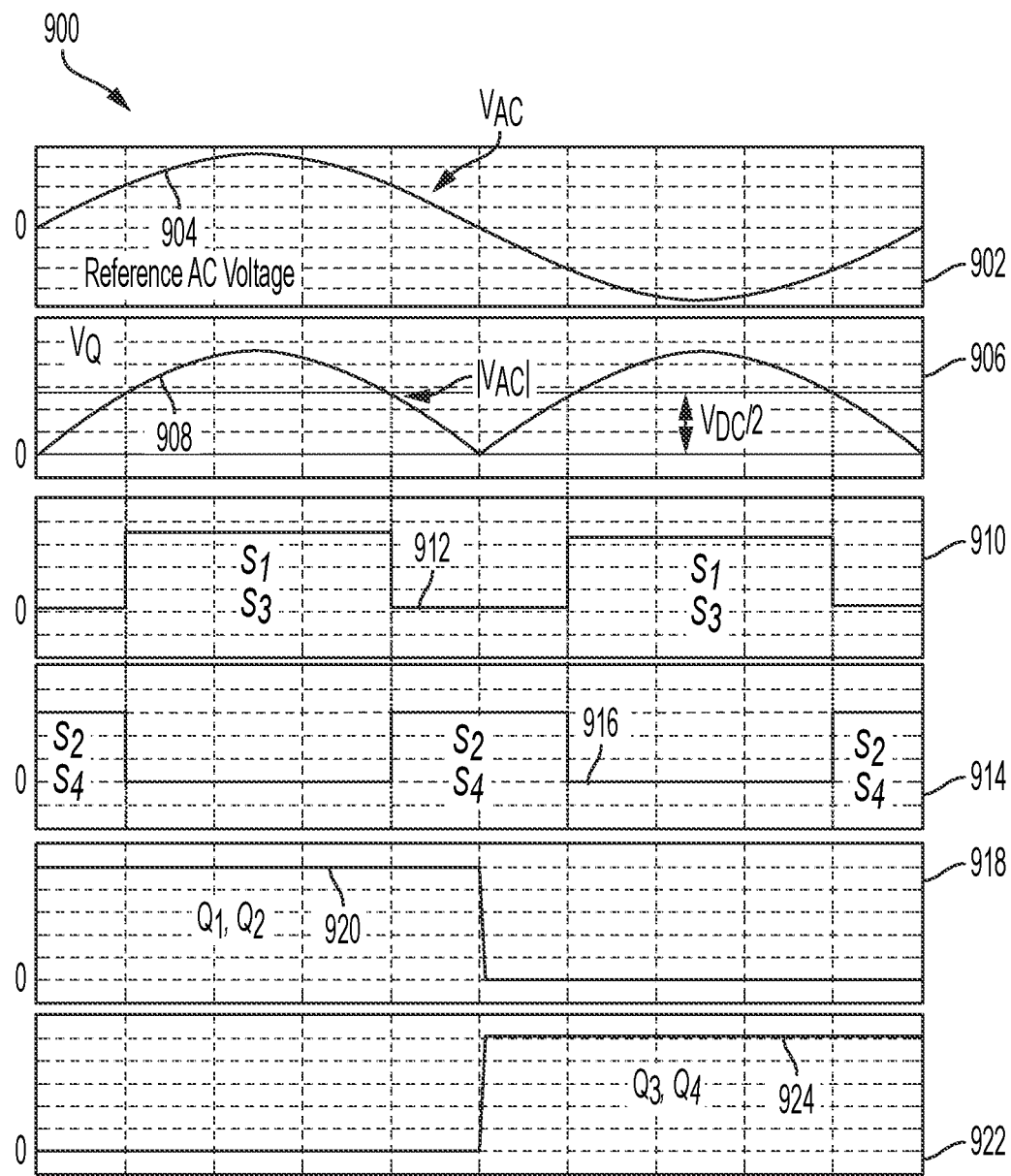
FIG. 9 illustrates a graphic diagram of a control scheme for operating a multiplexer and an unfolder circuit of the bi-directional AC/DC converter of FIG. 8 according to an example.

FIG. 9 illustrates a graphic diagram 900 of a control scheme for operating the multiplexer 306 and the unfolder circuit 314 of FIG. 8 according to an example. For example, the graphic diagram 900 may illustrate a control scheme executed by the controller 312 to control the switches 506-512, 800-806. A first graph 902 includes a reference-AC-waveform trace 904. A second graph 906 includes a rectified-AC-waveform trace 908. A third graph 910 includes a first control-signal trace 912. A fourth graph 914 includes a second control-signal trace 916. A fifth graph 918 includes a third control-signal trace 920. A sixth graph 922 includes a fourth control-signal trace 924.

The reference-AC-waveform trace 904 illustrates a reference sinusoidal wave, which may be representative of a desired waveform of AC power provided at the AC-power connection 310. The rectified-AC-waveform trace 908 illustrates a magnitude of an AC waveform provided to the AC-power connection 310. The first control-signal trace 912 illustrates one or more PWM signals provided to the first multiplexer switch 506 and the third multiplexer switch 510. The second control-signal trace 916 illustrates one or more PWM signals provided to the second multiplexer switch 508 and the fourth multiplexer switch 512. The third control-signal trace 920 illustrates one or more PWM signals provided to the first unfolder switch 800 and the second unfolder switch 802. The fourth control-signal trace 924 illustrates one or more PWM signals provided to the third unfolder switch 804 and the fourth unfolder switch 806.

In one example, the controller 312 is configured to close the first multiplexer switch 506 and the third multiplexer switch 510 to couple the first capacitor 502 and the second capacitor 504 to the interleaved bridges 308 when a magnitude of an AC voltage at the AC-power connection 310 is to exceed half of a magnitude of DC voltage provided by the DC-power source 528, that is, $V_{DC}/2$. In controlling the switches 506, 510 in this manner, the interleaved bridges 308 may be controlled to couple either the first capacitor 502 and the second capacitor 504 (for example, by closing the first upper switch 514) or only the second capacitor 504 (for example, by closing the first lower switch 518) to provide $V_{DC}$ and $V_{DC}/2$, respectively, to the AC-power connection 310. Similarly, the controller 312 may be configured to close the second multiplexer switch 508 and the fourth multiplexer switch 512 to couple the second capacitor 504 to the interleaved bridges 308 when a magnitude of an AC voltage at the AC-power connection 310 is to be less than or equal to $V_{DC}/2$. Accordingly, as illustrated by the first control-signal trace 912, the switches 506, 510 are closed where the rectified-AC-waveform trace 908 exceeds $V_{DC}/2$. As illustrated by the second control-signal trace 916, the switches 508, 512 are closed where the rectified-AC-waveform trace 908 is less than or equal to $V_{DC}/2$.

In at least one example, each of the capacitors 502, 504 is charged to a voltage of $V_{DC}/2$. Accordingly, when the switches 506, 510 are closed (for example, when a magnitude of an AC voltage at the AC-power connection 310 is to exceed $V_{DC}/2$), the capacitors 502, 504 collectively provide a voltage of approximately $V_{DC}$ to the interleaved bridges 308, and the interleaved bridges 308 may provide a voltage of approximately $V_{DC}/2$ (for example, by closing the first lower switch 518) or $V_{DC}$ (for example, by closing the first upper switch 514) to the AC-power connection 310. When the switches 508, 512 are closed (for example, when a magnitude of an AC voltage at the AC-power connection 310 is not to exceed $V_{DC}/2$), the second capacitor 504 provides a voltage of approximately $V_{DC}/2$ to the interleaved bridges 308.

In one example, the controller 312 is configured to close the first unfolder switch 800 and the second unfolder switch 802 during a positive half-cycle of AC power provided at the AC-power connection 310, and is configured to close the third unfolder switch 804 and the fourth unfolder switch 806 during a negative half-cycle of AC power provided at the AC-power connection 310. Accordingly, as illustrated by the third control-signal trace 920, the switches 800, 802 are closed where the reference-AC-waveform trace 904 has a positive value. As illustrated by the fourth control-signal trace 924, the switches 804, 806 are closed where the reference-AC-waveform trace 904 has a negative value. A control scheme of the bridge switches 514-520 may be substantially similar to the control scheme discussed above with respect to FIG. 7.

Accordingly, examples have been provided with respect to FIG. 8 in which the bi-directional AC/DC converter 300 is configured to convert DC power received via the DC-power connection 302 into AC power to be output at the AC-power connection 310. The bi-directional AC/DC converter 300 may also be configured to convert AC power received via the AC-power connection 310 into DC power to be output at the DC-power connection 302.

In one example, the unfolder switches 800-806 may be controlled to direct an AC voltage received at the AC-power connection 310 to the third capacitor 526. The third capacitor 526 may act as a smoothing capacitor. In some examples, the bridge switches 514-520, in combination at least with the inductors 522, 524, may be operated as a boost PFC circuit to provide DC power to the multiplexer switches 506-512. The multiplexer switches 506-512 may be operated to direct DC power from the bridge switches 514-520 to the DC busses 304.

As discussed above, the unfolder switches 800-806 may be considered to be in a full-bridge, or "H-bridge," configuration to provide power of alternating polarity to the AC-power connection 310. In another example of the unfolder circuit 314, unfolder switches may be configured in a half-bridge configuration to provide power of alternating polarity to the AC-power connection 310.

Figure 10:
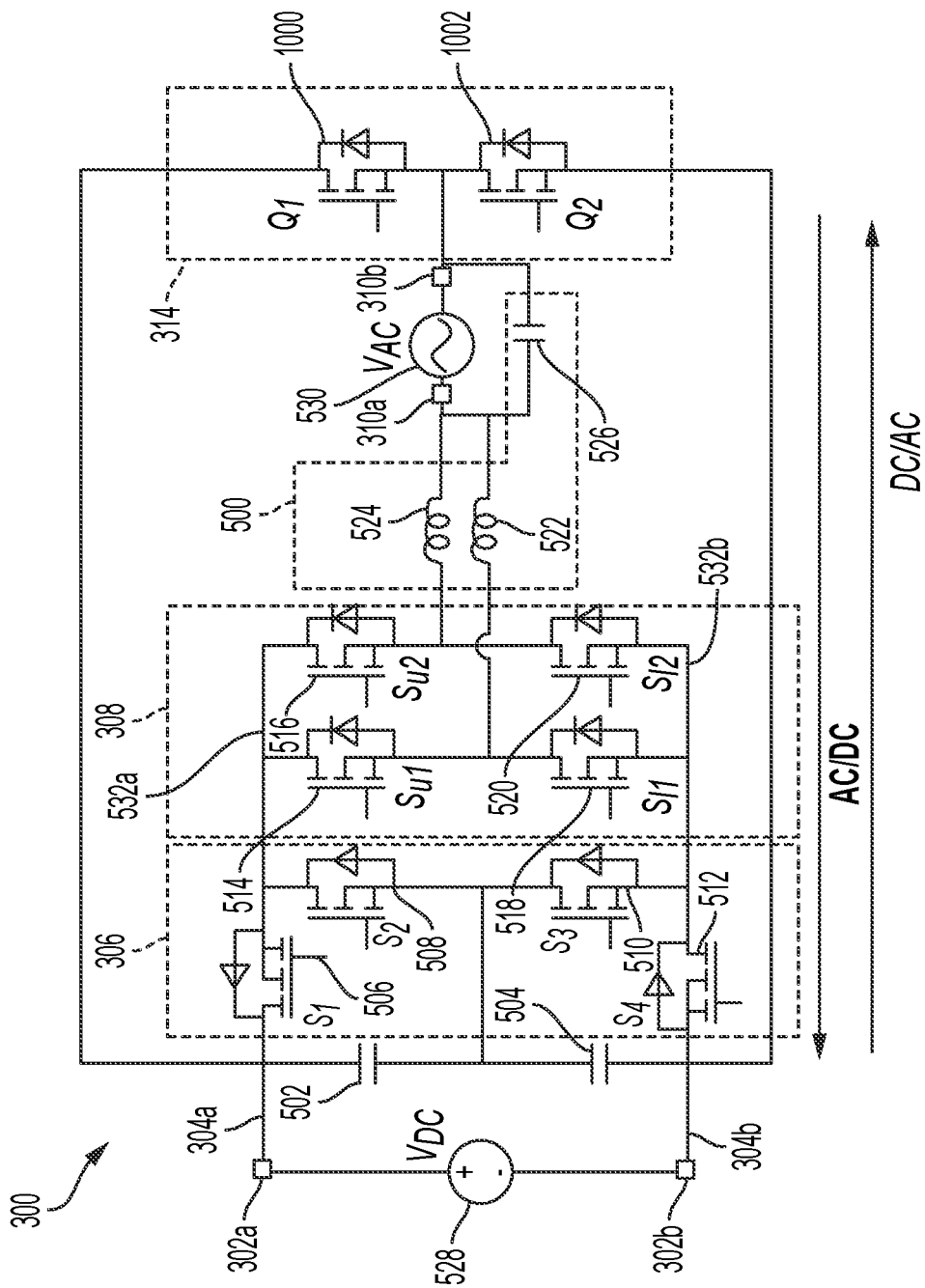
FIG. 10 illustrates a schematic diagram of the bi-directional AC/DC converter of FIG. 3 according to another example.

FIG. 10 illustrates a schematic diagram of the bi-directional AC/DC converter 300 according to another example. The example of FIG. 10 is similar to the example of FIG. 5, and like components are labeled accordingly. The bi-directional AC/DC converter 300 of FIG. 10 further includes an example of the unfolder circuit 314. The unfolder circuit 314 includes a first unfolder switch 1000 and a second unfolder switch 1002.

The first unfolder switch 1000 is coupled to the first DC-power connection 302a, the first capacitor 502, and the first multiplexer switch 506 at a first connection, is coupled to the second AC-power connection 310b, the third capacitor 526, and the second unfolder switch 1002 at a second connection, and is communicatively coupled to the controller 312 at a control connection. The second unfolder switch 1002 is coupled to the second AC-power connection 310b, the third capacitor 526, and the first unfolder switch 1000 at a first connection, is coupled to the second DC-power connection 302b, the second capacitor 504, and the fourth multiplexer switch 512 at a second connection, and is communicatively coupled to the controller 312 at a control connection.

As discussed above, the unfolder switches 1000, 1002 may be considered to be in a half-bridge configuration to provide power of alternating polarity to the AC-power connection 310 in some examples. For example, the second unfolder switch 1002 may be closed to provide positive-polarity power to the AC-power connection 310, and the first unfolder switch 1000 may be closed to provide negative-polarity power to the AC-power connection 310.

Figure 11:
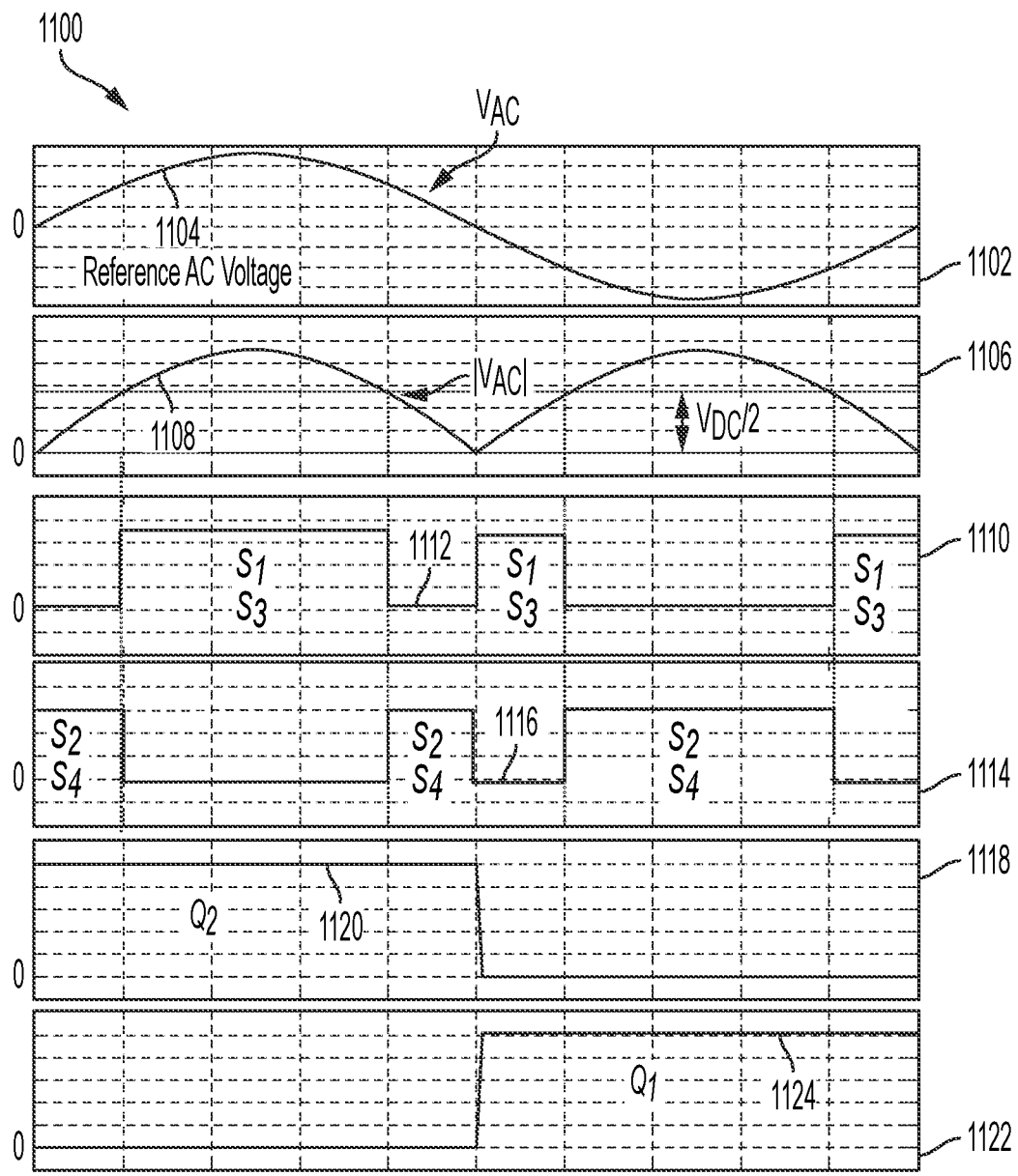
FIG. 11 illustrates a graphic diagram of a control scheme for operating a multiplexer and an unfolder circuit of the bi-directional AC/DC converter of FIG. 10 according to an example.

FIG. 11 illustrates a graphic diagram 1100 of a control scheme for operating the multiplexer 306 and the unfolder circuit 314 of FIG. 10 according to an example. For example, the graphic diagram 1100 may illustrate a control scheme executed by the controller 312 to control the switches 506-512, 1000, 1002. A first graph 1102 includes a reference-AC-waveform trace 1104. A second graph 1106 includes a rectified-AC-waveform trace 1108. A third graph 1110 includes a first control-signal trace 1112. A fourth graph 1114 includes a second control-signal trace 1116. A fifth graph 1118 includes a third control-signal trace 1120. A sixth graph 1122 includes a fourth control-signal trace 1124.

The reference-AC-waveform trace 1104 illustrates a reference sinusoidal wave, which may be representative of a desired waveform of AC power provided at the AC-power connection 310. The rectified-AC-waveform trace 1108 illustrates a magnitude of an AC waveform provided to the AC-power connection 310. The first control-signal trace 1112 illustrates one or more PWM signals provided to the first multiplexer switch 506 and the third multiplexer switch 510. The second control-signal trace 1116 illustrates one or more PWM signals provided to the second multiplexer switch 508 and the fourth multiplexer switch 512. The third control-signal trace 1120 illustrates one or more PWM signals provided to the second unfolder switch 1002. The fourth control-signal trace 1124 illustrates one or more PWM signals provided to the first unfolder switch 1000.

In one example, the controller 312 is configured to close the first multiplexer switch 506 and the third multiplexer switch 510 in either of two situations. In a first situation, a magnitude of an AC voltage at the AC-power connection 310 exceeds $V_{DC}/2$ and a polarity of the AC power at the AC-power connection 310 is positive. Closing the switches 506, 510 in conjunction with the second unfolder switch 1002 couples the capacitors 502, 504 to the interleaved bridges 308. In controlling the switches 506, 510, 1002 in this manner, the interleaved bridges 308 may be controlled to couple either the first capacitor 502 and the second capacitor 504 (for example, by closing the first upper switch 514) or only the second capacitor 504 (for example, by closing the first lower switch 518) to provide $V_{DC}$ and $V_{DC}/2$, respectively, to the AC-power connection 310. Accordingly, in an example in which the capacitors 502, 504 are each charged to a voltage of $V_{DC}/2$, the capacitors 502, 504 collectively provide a voltage of $V_{DC}$ to the interleaved bridges 308, and the interleaved bridges 308 may provide a voltage of either Vic or $V_{DC}/2$ to the AC-power connection 310. In a second situation, a magnitude of an AC voltage at the AC-power connection 310 is less than or equal to $V_{DC}/2$ and a polarity of the AC power at the AC-power connection 310 is negative. Closing the switches 506, 510 in conjunction with the first unfolder switch 1000 couples the first capacitor 502 to the interleaved bridges 308. Accordingly, in an example in which the capacitors 502, 504 are each charged to a voltage of $V_{DC}/2$, the first capacitor 502 provides a voltage of $-V_{DC}/2$ to the interleaved bridges 308.

Similarly, the controller 312 may be configured to close the second multiplexer switch 508 and the fourth multiplexer switch 512 in either of two situations. In a first situation, a magnitude of an AC voltage at the AC-power connection 310 exceeds $V_{DC}/2$ and a polarity of the AC power at the AC-power connection 310 is negative. Closing the switches 508, 512 in conjunction with the first unfolder switch 1000 couples the capacitors 502, 504 to the interleaved bridges 308. Accordingly, in an example in which the capacitors 502, 504 are each charged to a voltage of $V_{DC}/2$, the capacitors 502, 504 collectively provide a voltage of $-V_{DC}$ to the interleaved bridges 308. In controlling the switches 508, 512, 1000 in this manner, the interleaved bridges 308 may be controlled to couple either the first capacitor 502 and the second capacitor 504 (for example, by closing the second lower switch 520) or only the first capacitor 502 (for example, by closing the second upper switch 516) to provide $-V_{DC}$ and $-V_{DC}/2$, respectively, to the AC-power connection 310. In a second situation, a magnitude of an AC voltage at the AC-power connection 310 is less than or equal to $V_{DC}/2$ and a polarity of the AC power at the AC-power connection 310 is positive. Closing the switches 508, 512 in conjunction with the second unfolder switch 1002 couples the second capacitor 504 to the interleaved bridges 308. Accordingly, in an example in which the capacitors 502, 504 are each charged to a voltage of $V_{DC}/2$, the second capacitor 504 provides a voltage of $V_{DC}/2$ to the interleaved bridges 308.

Accordingly, as illustrated by the first control-signal trace 1112, the switches 506, 510 are closed where the reference-AC-waveform trace 1104 is between $+V_{DC}/2$ and $+V_{DC}$, or between 0 and $-V_{DC}/2$. As illustrated by the second control-signal trace 1116, the switches 508, 512 are closed where the reference-AC-waveform trace 1104 is between 0 and $+V_{DC}/2$, or between $-V_{DC}/2$ and $-V_{DC}$.

In one example, the controller 312 is configured to close the second unfolder switch 1002 during a positive half-cycle of AC power provided at the AC-power connection 310, and is configured to close the first unfolder switch 1000 during a negative half-cycle of AC power provided at the AC-power connection 310. Accordingly, as illustrated by the third control-signal trace 1120, the second unfolder switch 1002 is closed where the reference-AC-waveform trace 1104 has a positive value. As illustrated by the fourth control-signal trace 1124, the first unfolder switch 1000 is closed where the reference-AC-waveform trace 1104 has a negative value. A control scheme of the bridge switches 514-520 may be substantially similar to the control scheme discussed above with respect to FIG. 7.

Accordingly, examples have been provided with respect to FIG. 10 in which the bi-directional AC/DC converter 300 is configured to convert DC power received via the DC-power connection 302 into AC power to be output at the AC-power connection 310. The bi-directional AC/DC converter 300 may also be configured to convert AC power received via the AC-power connection 310 into DC power to be output at the DC-power connection 302.

In one example, the bridge switches 514-520, in combination at least with the inductors 522, 524, may be operated as a boost PFC circuit. The multiplexer switches 506-512 may be operated to direct DC power from the bridge switches 514-520 to the DC busses 304 to charge the DC-power source 528. In some examples, the unfolder switches 1000, 1002 may be maintained in a closed and conducting position while converting AC power to DC power. In other examples, the unfolder switches 1000, 1002 may be maintained in an open and non-conducting position, but body diodes thereof may remain conductive.

Accordingly, examples have been provided in which a bi-directional AC/DC converter converts AC power to DC power and/or converts DC power to AC power. Various modifications to the examples provided are within the scope of the disclosure.

For example, although in some examples the interleaved bridges 308 may include two half-bridges (including, for example, the first upper switch 514 and the first lower switch 518, and the second upper switch 516 and the second lower switch 520), in other examples the interleaved bridges 308 may include more than two half-bridges. A ripple current of the bi-directional AC/DC converter 300 (for example, in inductors coupled to the half-bridges, such as the inductors 522, 524) may be reduced by adding additional half-bridges. In some examples, a control scheme of respective bridge switches in the additional half-bridges may be altered based on a number of additional half-bridges. For example, a phase shift between the carrier signals corresponding to each of the half-bridges may be described by the function $2\pi/N$, where N is equal to a number of half-bridges. In some examples, each additional half-bridge may be coupled to a corresponding additional inductor.

Furthermore, as discussed above, the bi-directional AC/DC converter 300 may be implemented in various configurations, including as the first bi-directional AC/DC converter 204 and/or the second bi-directional AC/DC converter 214. However, it is to be appreciated that the bi-directional AC/DC converter 300 may be implemented in a variety of other configurations. For example, the bi-directional AC/DC converter 300 may be implemented in devices other than UPSs, or may be a stand-alone device. Accordingly, no limitation is implied by examples in which the bi-directional AC/DC converter 300 is implemented in connection with UPSs, which are provided for purposes of explanation only.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A bi-directional AC/DC converter comprising:
   a DC-power connection configured to be coupled to a DC-power source;
   an AC-power connection configured to be coupled to at least one of an AC-power source or a load;
   a multiplexer having a plurality of multiplexer switches;
   at least one interleaved bridge circuit having a plurality of interleaved bridge switches coupled to the multiplexer and being interleaved with one another, the at least one interleaved bridge circuit including a first DC-node connection, a second DC-node connection, and an AC-node connection coupled to a midpoint of the plurality of interleaved bridge switches;
   an unfolder circuit including a plurality of unfolder switches coupled to the AC-power connection and to the DC-power connection;
   at least one controller configured to control, during a back-up mode of operation, the plurality of unfolder switches to couple the AC-power connection to the DC-power connection and to provide power received from the DC-power source to the AC-power connection; and
   a positive DC node and a negative DC node coupled to the plurality of multiplexer switches,
   wherein the plurality of interleaved bridge switches includes at least two bridge switches coupled between the AC-power connection and at least one of the positive DC node or the negative DC node, and wherein the first DC-node connection is coupled to the positive DC node, the second DC-node connection is coupled to the negative DC node, and the AC-node connection is coupled to the AC-power connection.

2. The bi-directional AC/DC converter of claim 1, wherein the at least one interleaved bridge circuit includes a first half-bridge circuit and a second half-bridge circuit.

3. The bi-directional AC/DC converter of claim 2, wherein the first half-bridge circuit includes a first upper switch and a first lower switch, and wherein the second half-bridge circuit includes a second upper switch and a second lower switch.

4. The bi-directional AC/DC converter of claim 3, wherein the first upper switch and the second upper switch are coupled between the positive DC node and the AC-power connection, and the first lower switch and the second lower switch are coupled between the negative DC node and the AC-power connection, the first half-bridge circuit being interleaved with the second half-bridge circuit.

5. The bi-directional AC/DC converter of claim 3, further comprising a filter coupled between the AC-power connection and at least one of the first upper switch and the first lower switch, or the second upper switch and the second lower switch.

6. The bi-directional AC/DC converter of claim 5, wherein the filter includes:
   a capacitor configured to be coupled in parallel with the load; and
   at least one of
      a first inductor having a first connection coupled between the first upper switch and the first lower switch, and a second connection coupled to the capacitor, or
      a second inductor having a first connection coupled between the second upper switch and the second lower switch, and a second connection coupled to the capacitor.

7. The bi-directional AC/DC converter of claim 1, wherein the at least one controller is configured to:
   operate the plurality of multiplexer switches to switch at a first frequency; and
   operate the plurality of interleaved bridge switches to switch at a second frequency being different than the first frequency.

8. The bi-directional AC/DC converter of claim 7, wherein the second frequency is greater than the first frequency.

9. The bi-directional AC/DC converter of claim 7, wherein the first frequency is based on a line frequency of AC power at the AC-power connection.

10. The bi-directional AC/DC converter of claim 1, wherein the plurality of multiplexer switches includes a first set of multiplexer switches coupled between the positive DC node and the negative DC node, and a second set of multiplexer switches including a first multiplexer switch coupled between the DC-power connection and the positive DC node and a second multiplexer switch coupled between the DC-power connection and the negative DC node.

11. The bi-directional AC/DC converter of claim 1, wherein a voltage stress across each multiplexer switch of the plurality of multiplexer switches is not greater than about half of a voltage of the DC-power source.

12. The bi-directional AC/DC converter of claim 1, wherein a voltage stress across each interleaved bridge switch of the plurality of interleaved bridge switches is not greater than about half of a voltage of the DC-power source.

13. The bi-directional AC/DC converter of claim 1, wherein the at least one controller is configured to operate the plurality of interleaved bridge switches in critical-conduction mode.

14. The bi-directional AC/DC converter of claim 13, wherein operating the plurality of interleaved bridge switches in critical-conduction mode provides zero-current switching to the plurality of interleaved bridge switches.

15. The bi-directional AC/DC converter of claim 13, wherein the at least one controller is configured to operate the plurality of interleaved bridge switches via phase-shifted carrier signals.

16. A non-transitory computer-readable medium storing thereon sequences of computer-executable instructions for controlling a bi-directional AC/DC converter comprising an AC-power connection configured to be coupled to at least one of an AC-power source or a load, a DC-power connection configured to be coupled to a DC-power source, a multiplexer having a plurality of multiplexer switches, at least one interleaved bridge circuit having a first DC-node connection, a second DC-node connection, and a plurality of interleaved bridge switches having a midpoint coupled to the AC-power connection and being coupled to the multiplexer, the interleaved bridge switches being interleaved with one another, an unfolder circuit including a plurality of unfolder switches coupled to the AC-power connection and to the DC-power connection, and a positive DC node and a negative DC node coupled to the plurality of multiplexer switches, the sequences of computer-executable instructions including instructions that instruct at least one processor to:
  operate the plurality of multiplexer switches to couple the first DC-node connection to the DC-power source via the positive DC node;
  operate the plurality of multiplexer switches to couple the second DC-node connection to the DC-power source via the negative DC node;
  operate a first interleaved bridge switch of the plurality of interleaved bridge switches to couple the AC-power connection to one of the positive DC node or the negative DC node via the midpoint;
  operate a second interleaved bridge switch of the plurality of interleaved bridge switches to couple the AC-power connection to the one of the positive DC node or the negative DC node via the midpoint; and
  operate, during a back-up mode of operation, the plurality of unfolder switches to couple the AC-power connection to the DC-power connection and to provide power received from the DC-power source to the AC-power connection.

17. The non-transitory computer-readable medium of claim 16, wherein the instructions instruct the at least one processor to operate the plurality of multiplexer switches at a first frequency, and to operate the plurality of interleaved bridge switches at a second frequency being different than the first frequency.

18. The non-transitory computer-readable medium of claim 17, wherein the first frequency is based on a line frequency of AC power at the AC-power connection.

19. The non-transitory computer-readable medium of claim 17, wherein the second frequency is greater than the first frequency.

20. A bi-directional AC/DC converter comprising:
  a DC-power connection configured to be coupled to a DC-power source;
  an AC-power connection configured to be coupled to at least one of an AC-power source or a load;
  a multiplexer having a plurality of multiplexer switches;
  at least one interleaved bridge circuit having a plurality of interleaved bridge switches being interleaved with one another, the at least one interleaved bridge circuit including a first DC-node connection coupled to the DC-power source via a positive DC node, a second DC-node connection coupled to the DC-power source via a negative DC node, and an AC-node connection coupled to a midpoint of the plurality of interleaved bridge switches and coupled to the AC-power connection;
  an unfolder circuit coupled to the AC-power connection and to the DC-power connection and having a plurality of unfolder switches; and
  at least one controller configured to control, during a back-up mode of operation, the plurality of unfolder switches to couple the AC-power connection to the DC-power connection and to provide power received from the DC-power source to the AC-power connection.

* * * * *